United States Patent
Kim et al.

(10) Patent No.: US 9,681,423 B2
(45) Date of Patent: Jun. 13, 2017

(54) METHOD FOR EFFICIENTLY TRANSMITTING PHYSICAL CHANNEL IN MULTI-CARRIER AGGREGATION STATE TO SUPPORT BROADBAND

(75) Inventors: So Yeon Kim, Anyang-si (KR); Jae Hoon Chung, Anyang-si (KR); Yeong Hyeon Kwon, Anyang-si (KR); Seung Hee Han, Anyang-si (KR); Moon Il Lee, Anyang-si (KR)

(73) Assignee: LG Electronics Inc., Seoul (KR)

(*) Notice: Subject to any disclaimer, the term of this patent is extended or adjusted under 35 U.S.C. 154(b) by 1053 days.

(21) Appl. No.: 13/126,552

(22) PCT Filed: Oct. 29, 2009

(86) PCT No.: PCT/KR2009/006282
§ 371 (c)(1),
(2), (4) Date: Jun. 29, 2011

(87) PCT Pub. No.: WO2010/050754
PCT Pub. Date: May 6, 2011

(65) Prior Publication Data
US 2011/0268032 A1    Nov. 3, 2011

Related U.S. Application Data

(60) Provisional application No. 61/109,477, filed on Oct. 29, 2008, provisional application No. 61/109,897, (Continued)

(51) Int. Cl.
*H04L 5/00* (2006.01)
*H04L 1/18* (2006.01)
(Continued)

(52) U.S. Cl.
CPC ......... *H04W 72/04* (2013.01); *H04L 1/1671* (2013.01); *H04L 1/1861* (2013.01); *H04L 5/001* (2013.01); *H04L 5/0007* (2013.01); *H04L 5/0053* (2013.01)

(58) Field of Classification Search
CPC ..... H04L 5/001; H04L 5/0007; H04L 5/0053; H04L 1/1671; H04L 1/1861;
(Continued)

(56) References Cited

U.S. PATENT DOCUMENTS 8,699,467 B2 * 4/2014 Lindoff et al. ............... 370/332
2006/0111129 A1 5/2006 Ihm et al.
(Continued)

OTHER PUBLICATIONS

3GPP, "3rd Generation Partnership Project; technical Specification Group Radio Access Network; Evolved Universal Terrestrial Radio Access (E-UTRA); Physical layer procedures (Release 8)", 3GPP TS 36.213, V8.4.0, Sep. 2008, p. 1-60.

*Primary Examiner* — Ayaz Sheikh
*Assistant Examiner* — Debebe Asefa
(74) *Attorney, Agent, or Firm* — Birch, Stewart, Kolasch & Birch, LLP

(57) ABSTRACT

The present invention relates to a wireless connection system, and more specifically to a method for efficiently transmitting a control channel in a multi-carrier aggregation state. According to one aspect of the invention, a method for enabling a terminal to transmit data in a broadband wireless connection system that supports multiband comprises the steps of: receiving uplink acknowledgement information from a base station through a first downlink component carrier among plural downlink component carriers available in the terminal; transmitting data to the base station through an uplink resource indicated by the uplink acknowledge information; and receiving feedback information from the base station through the first control channel of the first
(Continued)

(a)

(b)

downlink component carrier, wherein the feedback information indicates whether there is an error in the reception of the transmitted data.

12 Claims, 11 Drawing Sheets

Related U.S. Application Data filed on Oct. 30, 2008, provisional application No. 61/142,220, filed on Jan. 2, 2009, provisional application No. 61/172,205, filed on Apr. 23, 2009, provisional application No. 61/241,365, filed on Sep. 10, 2009, provisional application No. 61/246,542, filed on Sep. 29, 2009.

(51) Int. Cl.
*H04L 1/16* (2006.01)
*H04W 72/04* (2009.01)

(58) Field of Classification Search
CPC ... H04L 5/0092; H04L 1/1835; H04L 5/0005; H04L 5/0037; H04L 5/006; H04W 72/04; H04W 72/042; H04W 74/0833; H04W 74/006
USPC .......................... 370/254–350; 709/201–213
See application file for complete search history.

(56) References Cited

U.S. PATENT DOCUMENTS

| | | |
|---|---|---|
| 2008/0043677 A1 | 2/2008 | Kim et al. |
| 2009/0300456 A1* | 12/2009 | Pelletier et al. ............... 714/749 |
| 2010/0098012 A1* | 4/2010 | Bala et al. ..................... 370/329 |
| 2010/0118720 A1* | 5/2010 | Gauvreau et al. ............. 370/252 |
| 2010/0178895 A1* | 7/2010 | Maeda et al. .............. 455/404.1 |
| 2010/0227569 A1* | 9/2010 | Bala ...................... H04L 5/0007 455/73 |
| 2010/0272035 A1* | 10/2010 | Park .................... H04W 74/006 370/329 |

\* cited by examiner

[FIG 1]
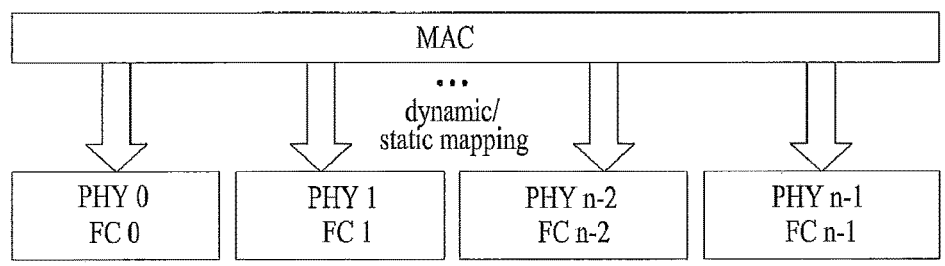
(a)
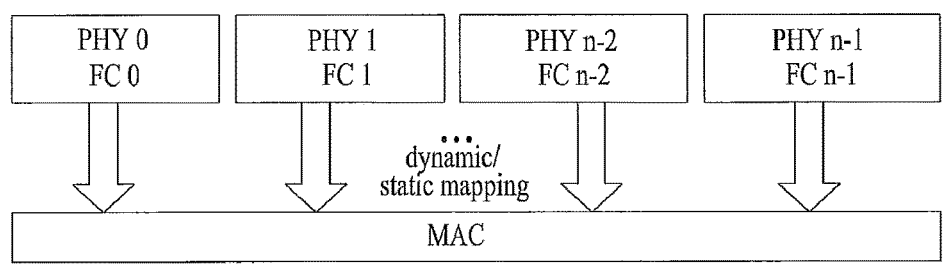
(b)

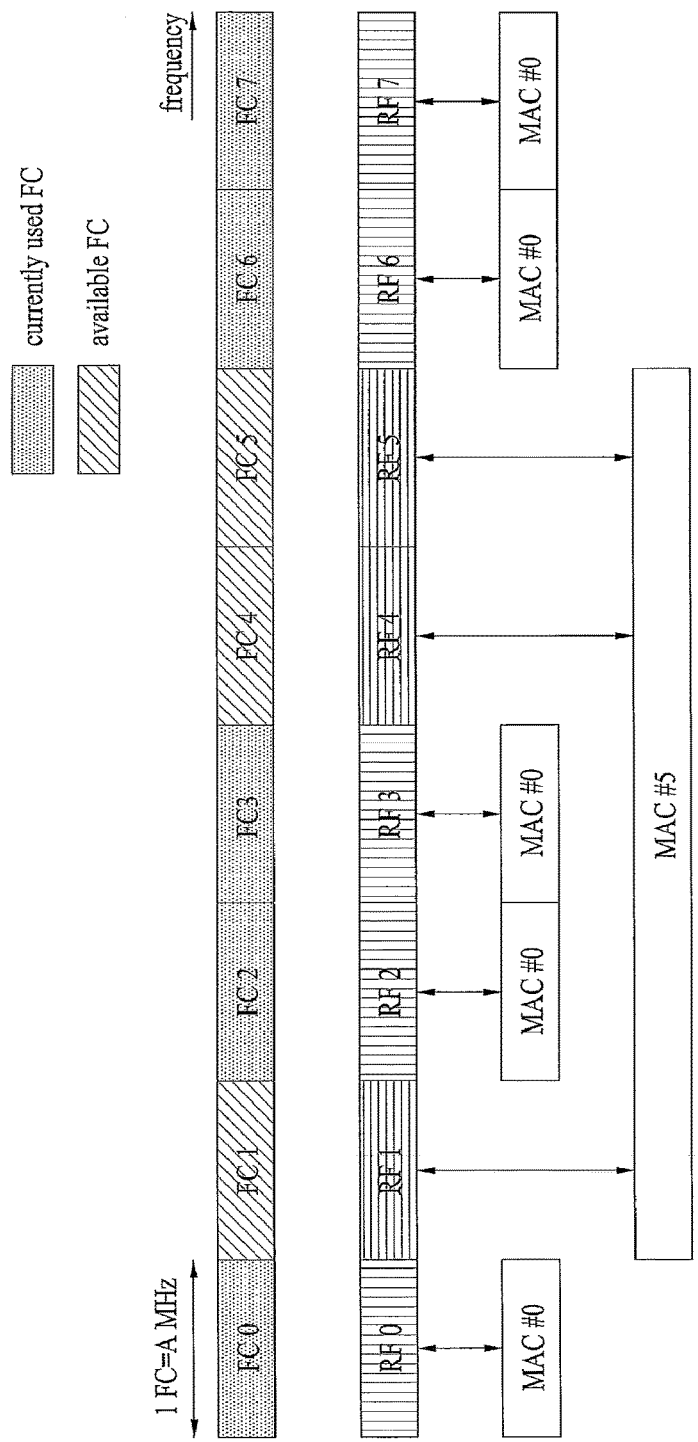

[FIG 3]
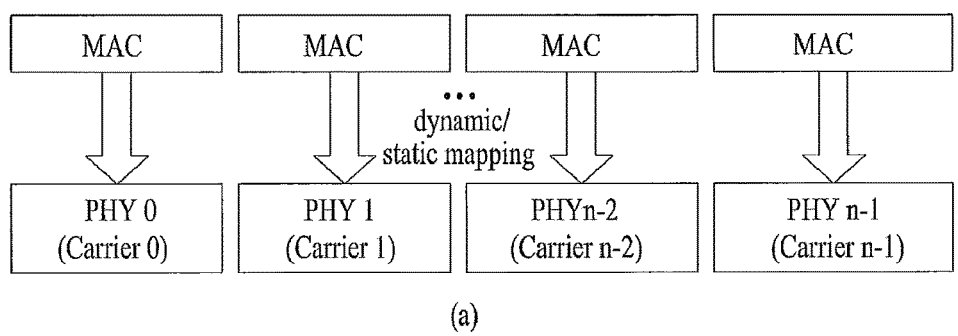
(a)
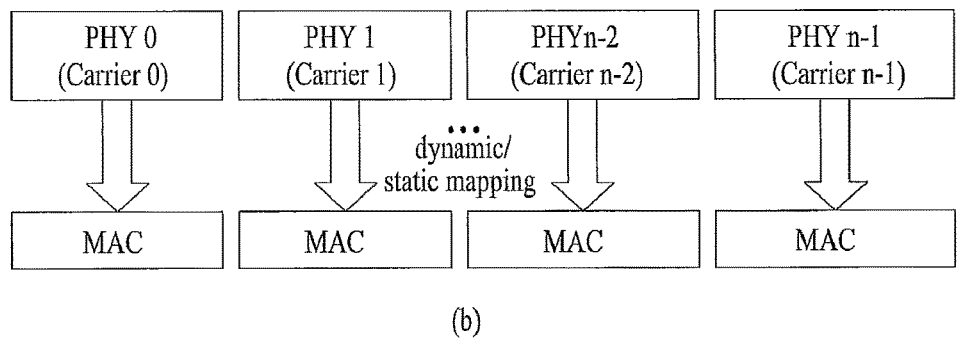
(b)

[FIG 4]
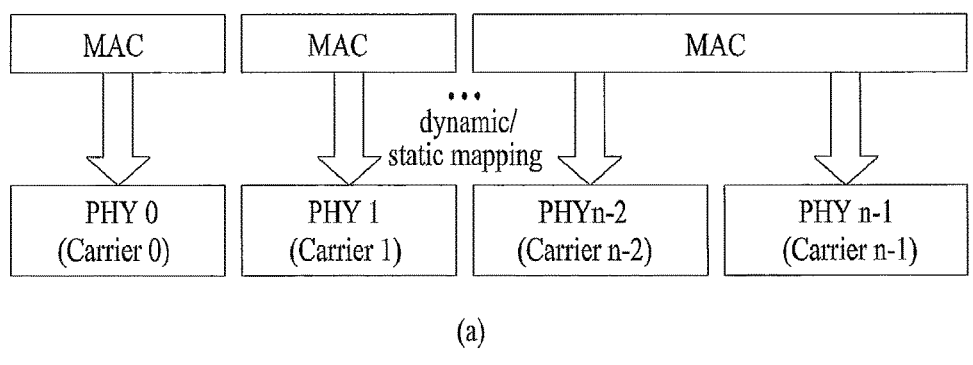
(a)
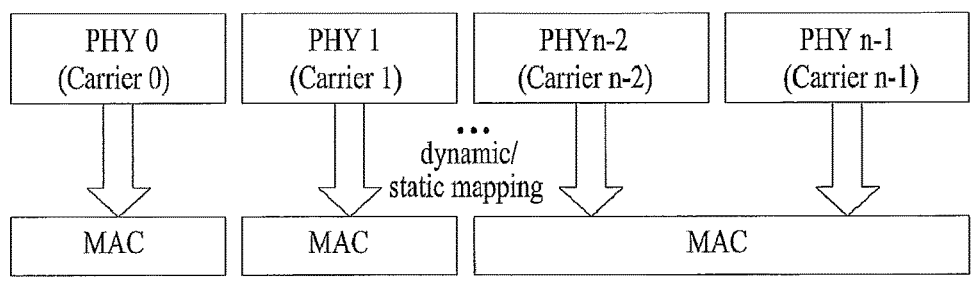
(b)

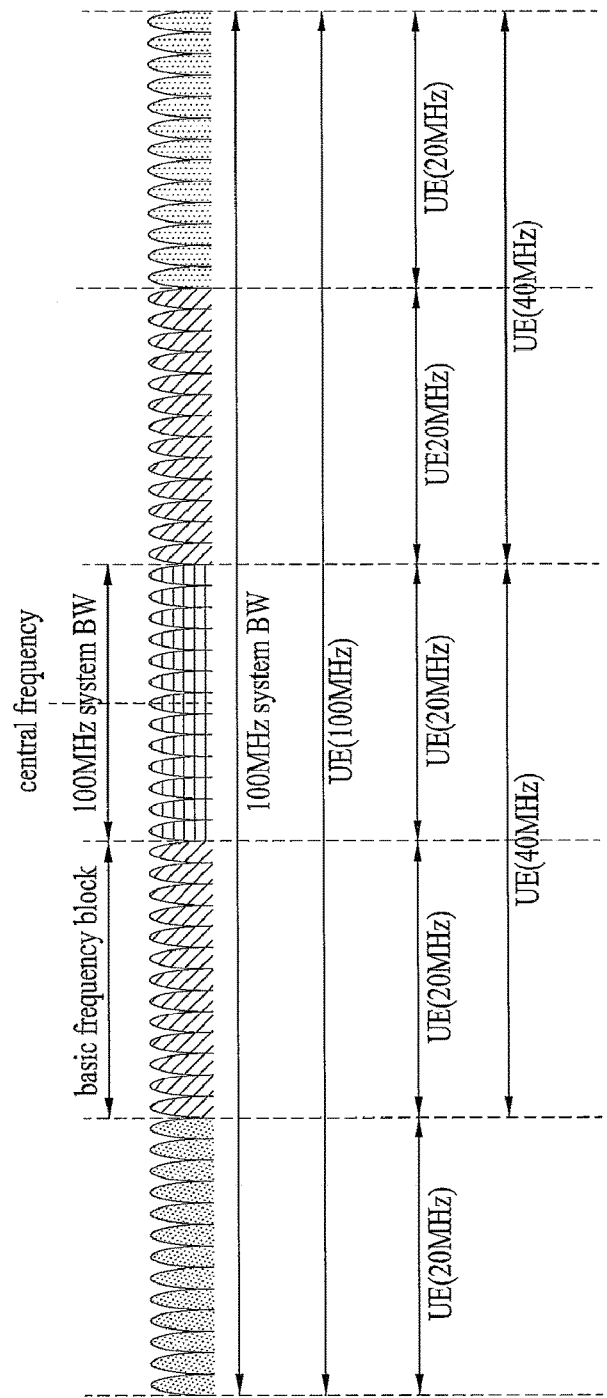
[FIG 5]

[FIG 6]
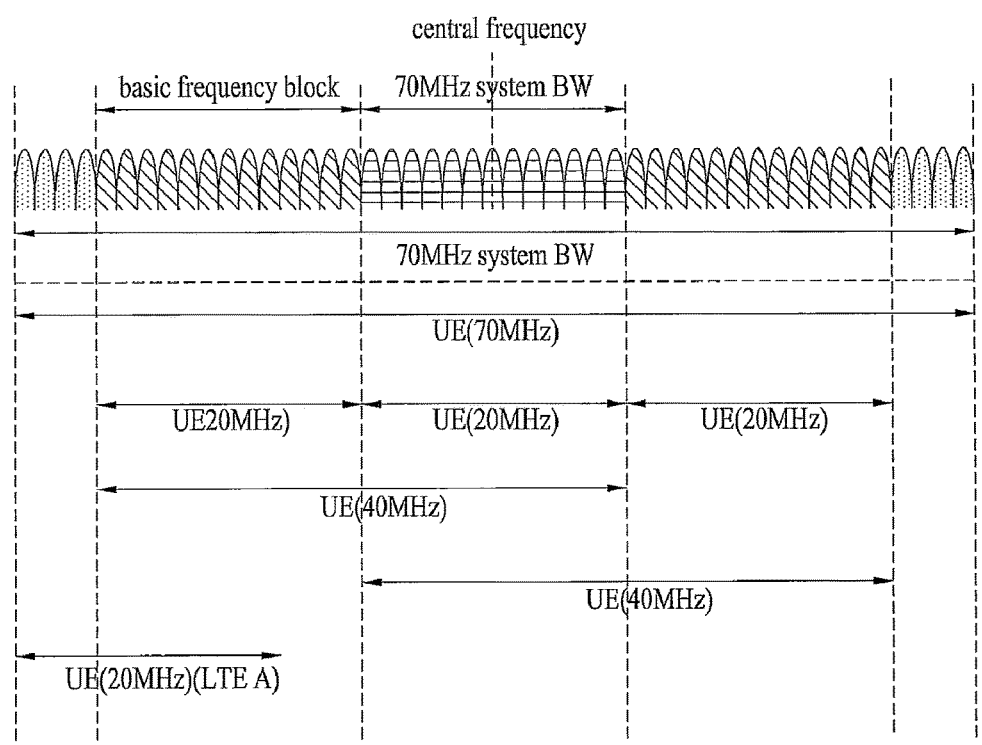

[FIG 7]
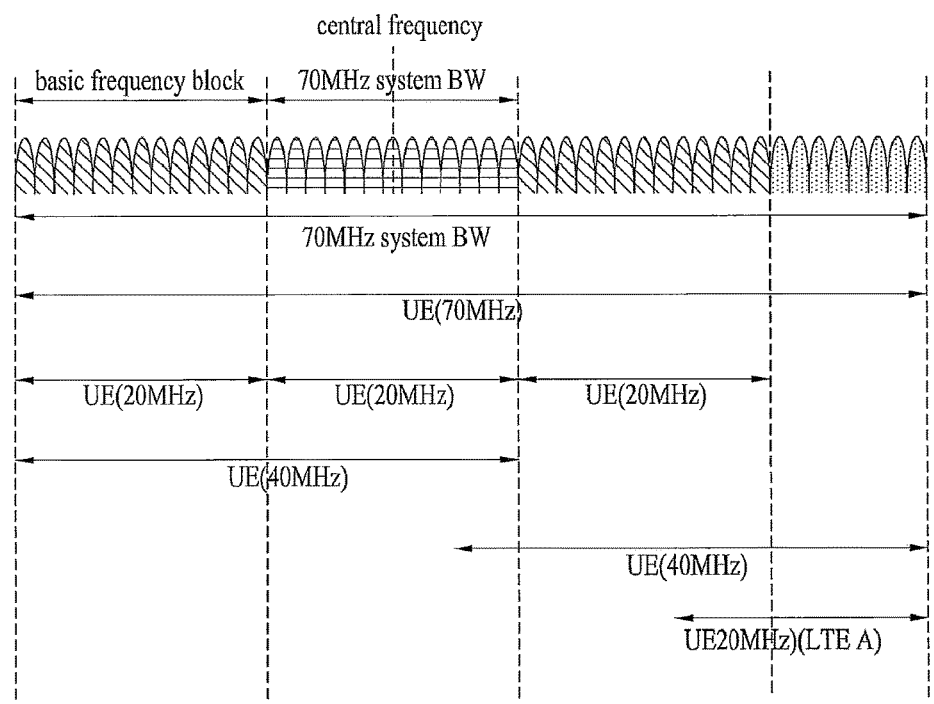

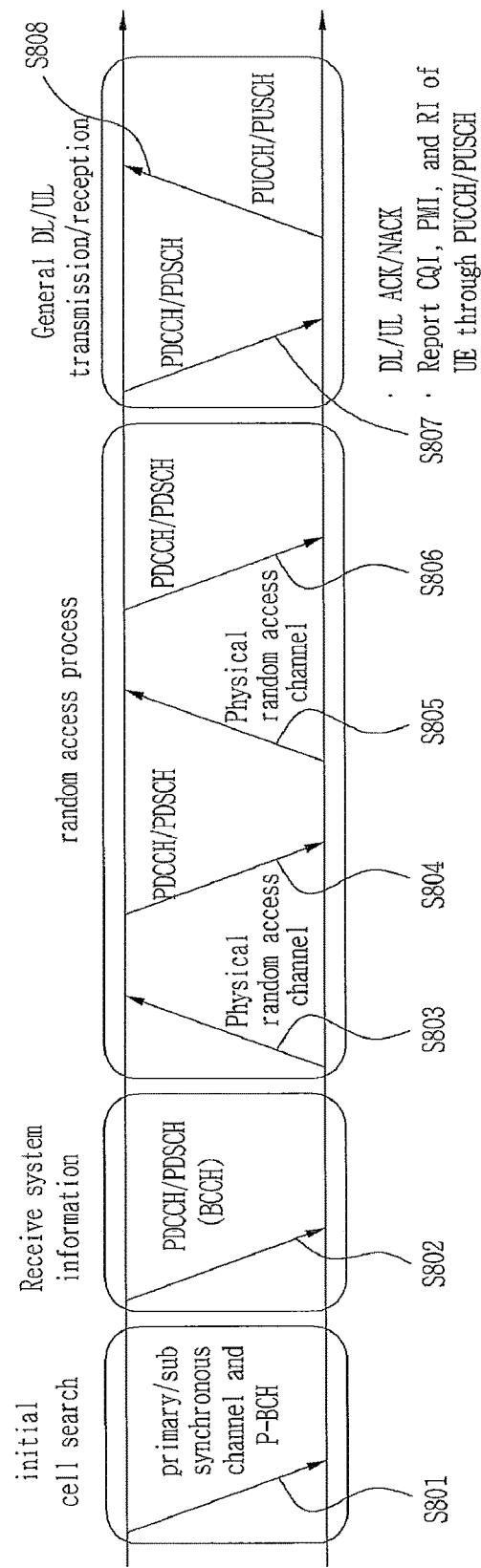

[FIG 9]
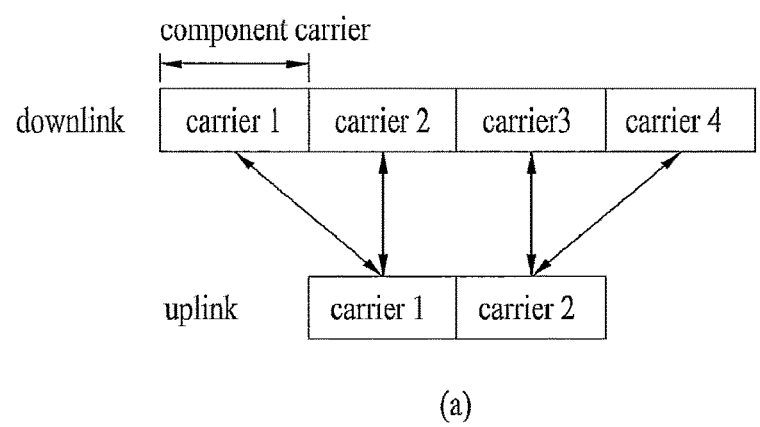
(a)
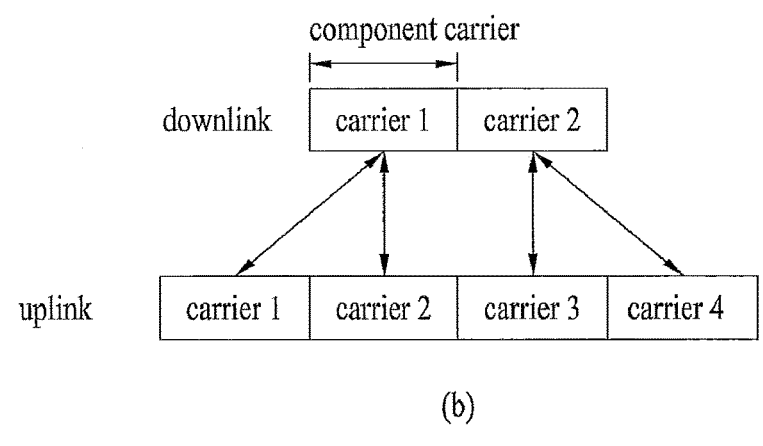
(b)

[FIG 10]
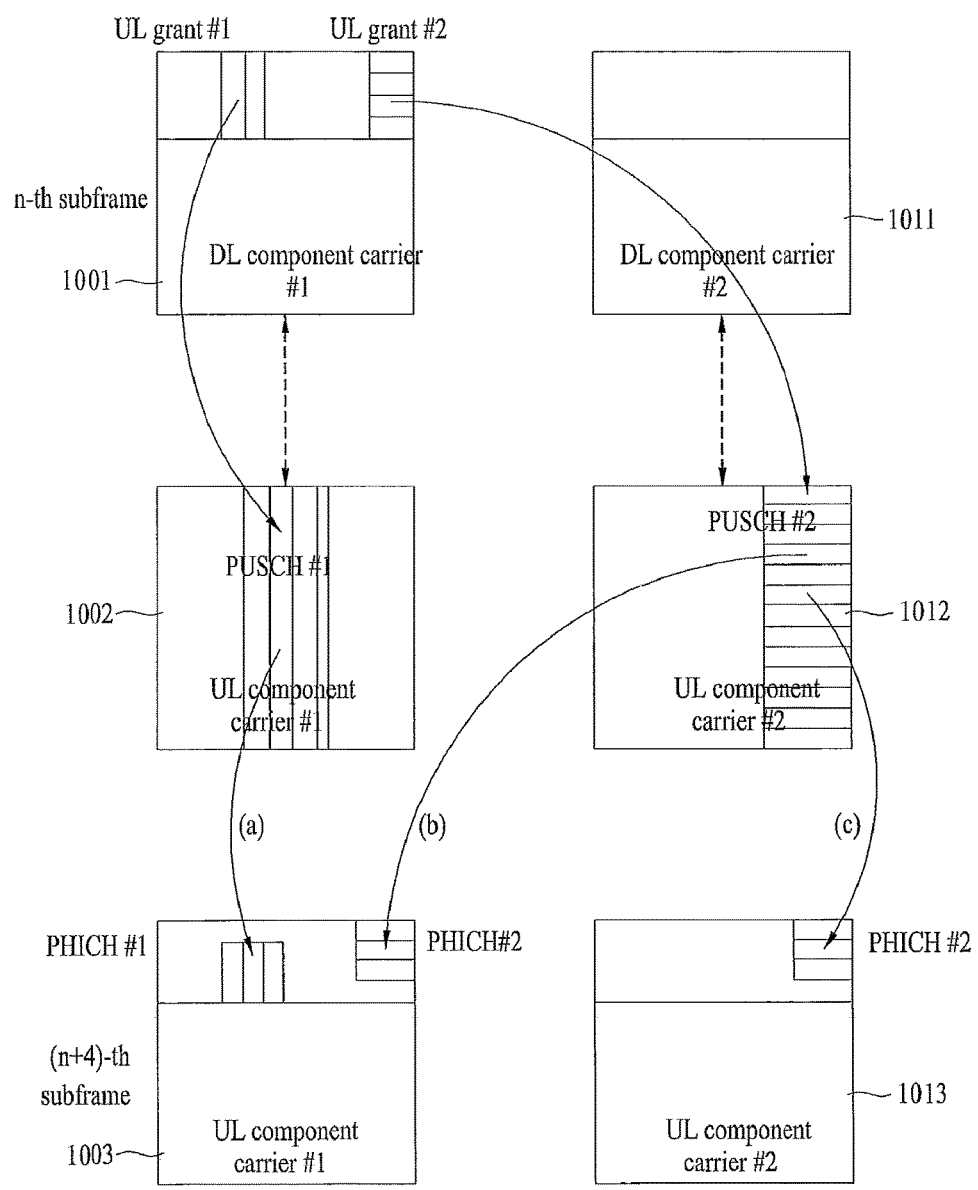

[FIG 11]
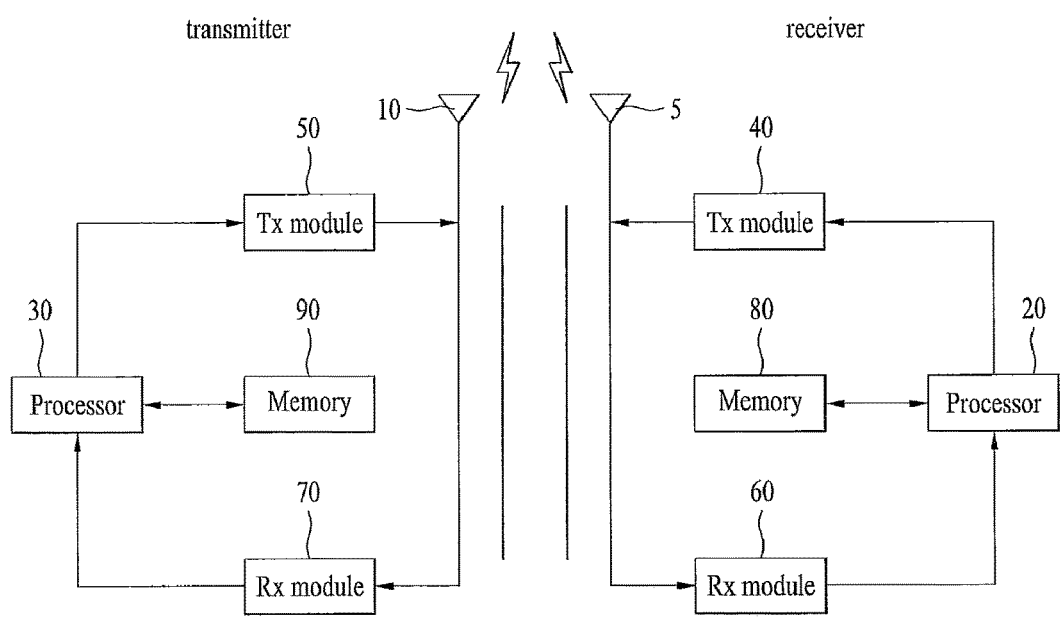

ature of a sine wave or a periodic pulse wave may be modulated to include information. The sine wave or pulse wave serving to convey information is called a carrier.

METHOD FOR EFFICIENTLY TRANSMITTING PHYSICAL CHANNEL IN MULTI-CARRIER AGGREGATION STATE TO SUPPORT BROADBAND

CROSS REFERENCE TO RELATED APPLICATIONS

This application is the National Phase of PCT/KR2009/006282 filed on Oct. 29, 2009, which claims the benefit under 35 U.S.C. 119(e) of U.S. Provisional Application Nos. 61/109,477; 61/109,897; 61/142,220; 61/172,205; 61/241,365; 61/246,542 filed on Oct. 29, 2008; Oct. 30, 2008; Jan. 2, 2010; Apr. 23, 2009; Sep. 10, 2009 and Sep. 29, 2009 respectively, all of which are hereby expressly incorporated by reference into the present application.

TECHNICAL FIELD

The present invention relates to a wireless access system, and more particularly to a method for effectively transmitting a control channel in a multi-carrier aggregation state.

BACKGROUND ART

A brief description of carriers will be given hereinbelow.

The amplitude, frequency, and/or phase of a sine wave or a periodic pulse wave may be modulated to include information. The sine wave or pulse wave serving to convey information is called a carrier.

Methods for modulating a carrier include single-carrier modulation (SCM) and multi-carrier modulation (MCM). In SCM, modulation is performed such that all information is carried on a single carrier.

MCM divides an entire channel bandwidth of one carrier into subchannels having multiple narrow bandwidths and transmits multiple narrowband subcarriers through respective subchannels.

When using MCM, each subchannel may approximate to a flat channel due to a narrow bandwidth. A user may compensate for channel distortion using a simple equalizer. MCM may be implemented at a high speed using Fast Fourier Transform (FFT). Namely, MCM is favored over SCM during high-rate data transmission.

As the capabilities of abase station and/or a terminal have been developed, a frequency bandwidth which can be provided or used by the base station and/or the terminal has been increased. Accordingly, in the embodiments of the present invention, a multi-carrier system supporting a broadband service by aggregating one or more carriers is proposed.

Specifically, the multi-carrier system, which will be described hereafter, uses carriers by aggregating one or more carriers, unlike the afore-mentioned MCM scheme which uses carriers by segregating one carrier.

To efficiently use multiple bands or multiple carriers, a technique in which one medium access control (MAC) entity manages multiple carriers (e.g., multiple frequency carriers) has been proposed.

FIGS. 1(a) and 1(b) illustrate methods for transmitting and receiving signals based on a multi-band radio frequency (RF) scheme.

In FIGS. 1(a) and 1(b), one MAC layer in each of a transmitting end and a receiving end may manage multiple carriers to efficiently use the multiple carriers. To effectively transmit and receive the multiple carriers, it is assumed that both the transmitting end and the receiving end can transmit and receive multiple carriers. Since frequency carriers managed by one MAC layer do not need to be contiguous, the above method enables flexible resource management. More specifically, the frequency carriers may have contiguous aggregation or non-contiguous aggregation.

In FIGS. 1(a) and 1(b), physical layers (PHY 0, PRY 1, . . . , PHY n-2, and PHY n-1) represent multiple bands and each of the bands may have a frequency carrier (FC) size allocated for a specific service according to a predetermined frequency policy. For example, PHY 0 (RF carrier 0) may have a frequency band size allocated for a general FM radio broadcast and PHY 1 (RF carrier 1) may have a frequency band size allocated for cellular phone communication.

Although each frequency band may have a different FA size depending on the characteristics thereof, it is assumed in the following description that each frequency carrier (FC) has a size of A MHz for convenience of explanation. Each frequency allocation (FA) band may be represented by a carrier frequency that enables a baseband signal to be used in each frequency band. Thus, in the following description, each FA will be referred to as a "carrier frequency band" or will simply be referred to as a "carrier" representing each carrier frequency band unless such use causes confusion. As in the recent 3rd generation partnership project (3GPP) long term evolution-advanced (LTE-A), the carrier may also be referred to as a "component carrier" to discriminate it from a subcarrier used in the multi-carrier system.

As such, the "multi-band" scheme may also be referred to as a "multi-carrier" scheme or a "carrier aggregation" scheme.

In order to transmit a signal through multiple bands as shown in FIG. 1(a) as well as to receive a signal through multiple bands as shown in FIG. 1(b), it is necessary for a transceiver to include a Radio Frequency (RF) module that transmits and receives signals through multiple bands. In FIG. 1, a method for constructing the Medium Access Control (MAC) layer "MAC" is decided by a base station (BS) irrespective of downlink (DL) and uplink (UL).

In brief, FIG. 1 shows signal transmission/reception technology for enabling one MAC entity (simply referred to as a MAC) to manage/operate a plurality of RF carriers. In addition, RF carriers managed by one MAC need not be contiguous to one another. Therefore, the above-mentioned signal transmission/reception technology of the present invention is more flexible in terms of resource management. However, according to user requirements or channel environment, a MAC entity for each carrier can manage/operate individual carriers as shown in FIG. 1.

FIG. 2 exemplarily shows a frequency allocation method for use in a carrier aggregation system.

In FIG. 2, frequency carrier (FC 0 to FC 7) may be managed by RFs (RF 0 to RF 7). In FIG. 2, it is assumed that FC 0, FC 2, FC 3, FC 6 and FC 7 have already been allocated to a specific conventional communication service. In the meantime, available RFs (RF 1(FC 1), RF 4(FC 4), and RF 5(FC 5)) can be effectively managed by one MAC (MAC #5). In this case, RF carriers constructing one MAC may not be contiguous to one another as described above, such that it is possible to more effectively manage frequency resources.

However, a multiband-based communication scheme for use with a current mobile communication technology has been conceptually defined. If necessary, the multiband-based communication scheme may only require further assignment of a Frequency Carrier (FC). Therefore, a method for transmitting and receiving signals to implement more efficient and higher-performance processing, and methods for transmitting and receiving a physical channel need to be more specifically defined.

DISCLOSURE

Technical Problem

The present invention is directed to a method for effectively transmitting a physical channel in a multi-carrier aggregation situation supporting a broadband that substantially obviates one or more problems due to limitations and disadvantages of the related art.

An object of the present invention is to provide an effective communication system and method.

Another object of the present invention is to provide a method for effectively transmitting and receiving a physical channel in a multiband-based communication environment.

A further object of the present invention is to provide a method for deciding a downlink component carrier via which a Physical Hybrid ARQ Indicator Channel (PHICH) is efficiently transmitted in a multiband-based communication environment.

It will be appreciated by persons skilled in the art that the objects that can be achieved by the present invention are not limited to what has been particularly described hereinabove and the above and other objects that the present invention can achieve will be more clearly understood from the following detailed description taken in conjunction with the accompanying drawings.

Technical Solution

To achieve these objects and other advantages and in accordance with the purpose of the invention, as embodied and broadly described herein, the present invention provides a method for efficiently transmitting/receiving a physical channel and a method for transmitting/receiving data in a wireless communication system employing multiple carriers (multi-carrier).

In another aspect of the present invention, a method for transmitting data by a user equipment (UE) in a broadband wireless access system supporting multiple bands includes receiving uplink (UL) grant information from a base station (BS) through a first downlink (DL) component carrier from among several DL component carriers available in the user equipment (UE), transmitting data to the base station (BS) through uplink (UL) resources indicated by the UL grant information, and receiving feedback information indicating whether a reception error of the transmitted data occurs through a first control channel of the first DL component carrier.

The uplink (UL) resources may be uplink resources of an upl ink (UL) component carrier not linked to the first DL component carrier.

The reception of the feedback information may be performed irrespective of a ratio between the number of DL component carriers available in the user equipment (UE) and the number of UL component carriers available in the user equipment (UE).

The first control channel may be a Physical Hybrid ARQ Indicator Channel (PHICH).

In another aspect of the present invention, a method for enabling a base station (BS) to receive data from a user equipment (UE) in a broadband wireless access system supporting multiple bands includes transmitting uplink (UL) grant information to a user equipment (UE) through a first downlink (DL) component carrier from among several DL component carriers available in the user equipment (UE), receiving data from the user equipment (UE) through uplink (UL) resources indicated by the UL grant information, determining whether a reception error occurs in the received data, and transmitting feedback information depending on the determined result to the user equipment (UE) through a first control channel of the first DL component carrier.

The feedback information may be transmitted through the first DL component carrier only.

The uplink (UL) resources may be uplink resources of an uplink (UL) component carrier not linked to the first DL component carrier.

The transmission of the feedback information maybe performed irrespective of a ratio between the number of DL component carriers available in the user equipment (UE) and the number of UL component carriers available in the user equipment (UE).

The first control channel may be a Physical Hybrid ARQ Indicator Channel (PHICH).

In yet another aspect of the present invention, a user equipment (UE) operated in a broadband wireless access system supporting multiple bands includes a processor, and a radio frequency (RF) module for receiving a radio frequency (RF) signal from an external part upon receiving a control signal from the processor, demodulating/decoding the received RF signal, transmitting the decoded result to the processor, modulating/encoding data received from the processor, and transmitting the encoded result to an external part. Upon receiving uplink (UL) grant information from a base station (BS) through a first downlink (DL) component carrier from among available DL component carriers, the processor transmits data to the base station (BS) through uplink (UL) resources indicated by the UL grant information, receives feedback information indicating whether a reception error occurs in the transmitted data from the base station (BS) through a first control channel of the first DL component carrier, and exchanges data with the base station (BS).

The uplink (UL) resources may be uplink resources of an uplink (UL) component carrier not linked to the first DL component carrier.

The processor maybe configured to receive the feedback information through the first control channel of the first DL component carrier, irrespective of a ratio between the number of DL component carriers available in the user equipment (UE) and the number of UL component carriers available in the user equipment (UE).

The first control channel may be a Physical Hybrid ARQ Indicator Channel (PHICH).

It is to be understood that both the foregoing general description and the following detailed description of the present invention are exemplary and explanatory and are intended to provide further explanation of the invention as claimed.

Advantageous Effects the exemplary embodiments of the present invention have the following effects.

First, the embodiments of the present invention can provide effective communication.

Second, the embodiments of the present invention can enable physical channels of a Long Term Evolution (LTE) system to be transmitted and received in a multi-carrier environment.

Third, when using a method for deciding a physical hybrid ARQ indicator channel (PHICH) according to the present invention, a user equipment (UE) (or a mobile station (MS)) need not monitor control regions of all downlink component carriers, resulting in a reduction in blind decoding overhead of the UE.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

FIGS. 1(a) and 1(b) illustrate methods for transmitting and receiving signals based on a multi-band radio frequency (RF) scheme.

FIG. 2 exemplarily shows a method for allocating a frequency in a multi-carrier system.

FIGS. 3(a) and 3(b) exemplarily show a method for enabling a plurality of medium access control (MAC) layers to manage a plurality of carriers.

FIGS. 4(a) and 4(b) exemplarily show a method for enabling one MAC layer to manage one or more carriers.

FIGS. 5 and 6 show methods for establishing a carrier bandwidth in a multi-carrier system.

FIG. 7 shows another method for establishing a carrier bandwidth in a multi-carrier system.

FIG. 8 shows physical channels for use in a 3GPP LTE system serving as one example of a mobile communication system and a general signal transmission method using the physical channels.

FIGS. 9(a) and 9(b) show examples of an asymmetric carrier aggregation applicable to embodiments of the present invention.

FIG. 10 shows a transmission format of a physical hybrid ARQ indicator channel (PHICH) under a cross-carrier scheduling situation according to another embodiment of the present invention.

FIG. 11 is a block diagram illustrating a transmitter and a receiver according to another embodiment of the present invention.

MODE FOR INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details. For example, the following description will be given centering upon a 3rd Generation Partnership Project Long Term Evolution (3GPP LTE) mobile communication system, but the present invention is not limited thereto and the remaining parts of the present invention other than unique characteristics of the 3GPP LTE system are applicable to other mobile communication systems.

In some cases, in order to prevent ambiguity of the concepts of the present invention, conventional devices or apparatuses well known to those skilled in the art will be omitted and denoted in the form of a block diagram on the basis of the important functions of the present invention. Wherever possible, the same reference numbers will be used throughout the drawings to refer to the same or like parts.

In the fol lowing description, "terminal" may refer to a mobile or fixed user equipment (UE), for example, a user equipment (UE), a mobile station (MS) and the like. Also, "base station" (BS) may refer to an arbitrary node of a network end which communicates with the above terminal, and may include a Node B (Node-B), an eNode B (eNB) and the like.

In the embodiments of the present invention, a medium access control (MAC) layer may be used as a generic name of an upper layer conceptually higher than a physical layer PHY (or layer 1) according to the Open Systems Interconnection (OSI) 7 layer. In addition, although frequency carriers are configured to be contiguous to each other in the drawings, it should be noted that the frequency carriers may not be physically contiguous to each other.

A wireless environment considered in the present invention includes all general multi-carrier supporting environments. In other words, a multi-carrier system (also called a carrier aggregation system) for use in the embodiments of the present invention is configured to aggregate one or more carriers, each of which has a bandwidth smaller than that of an objective bandwidth, so as to construct and support a broadband service. When at least one carrier having a bandwidth that is less than that of the objective band, a bandwidth of the aggregated carrier may be limited to a bandwidth used in a conventional system so as to satisfy downward compatibility with a conventional IMT system. For example, the conventional 3GPP LTE system supports bandwidths of 1.4 MHz, 3 MHz, 5 MHz, 10 MHz, 15 MHz, and 20 MHz. The LTE_A system is configured to support a bandwidth larger than 20 MHz by aggregating the above-mentioned bandwidths supported by the LTE system. Alternatively, a new bandwidth may be defined irrespective of a bandwidth used in the conventional system, such that a carrier aggregation can be supported by the new bandwidth.

In addition, the term 'carrier aggregation' used in the present invention may include a contiguous carrier aggregation in which contiguous carriers can be aggregated, and a non-contiguous carrier aggregation (or a spectrum aggregation) in which non-contiguous aggregations can be aggregated. In addition, the carrier aggregation may be conceptually mixed with bandwidth (BW) aggregation as necessary.

FIGS. 3(a) and 3(b) exemplarily show a method for enabling a plurality of MAC layers to manage a plurality of carriers.

FIG. 3(a) shows a one-to-one mapping relationship between MAC layers and physical layers when a transmitter (Base Station BS) supports multiple carriers. FIG. 3(b) shows a one-to-one mapping relationship between MAC layers and physical (PHY) layers when a receiver (UE) supports multiple carriers. In this case, one physical layer may use one carrier.

FIGS. 4(a) and 4(b) exemplarily show a method for enabling one MAC layer to manage one or more carriers. In FIGS. 4(a) and 4(b), MAC layers managing specific carriers (Carrier 0 and Carrier 1) may be independently mapped to respective physical layers, or one MAC layer managing one or more specific carriers (Carrier n-2 and Carrier n-1) may be mapped to respective physical layers.

FIG. 4(a) shows a one-to-one or one-to-m (where m<1) mapping relationship between MAC layers and physical layers when a transmitting end (base station) supports multiple carriers. FIG. 4(b) shows a one-to-one or one-to-m mapping relationship between MAC layers and physical layers when a receiving end (UE) supports multiple carriers.

In a system supporting multiple carriers, carriers used by each terminal may differ according to capabilities of the base station (BS) and the UE. However, carrier band support abilities of the base station (BS) may be uniformly determined. The base station (BS) and the UE may negotiate with each other to decide whether to support carriers during call setup according to the capabilities of the base station (BS).

In the embodiments of the present invention, information as to carrier support of the UE, that is, information as to whether an arbitrary terminal can support an RF of a specific range or a specific frequency carrier may be one reference for identifying terminal (UE) categories.

Therefore, the base station (BS) and/or UE specify a specific range or a specific carrier according to UE categories or UE classes. Hence, the base station (BS) and the UE can negotiate with each other according to UE classes as to whether to support multiple carriers, whether to support simultaneous reception processing, simultaneous reception processing or adaptive carrier selection, parallel or sequential processing classification, and values such as carrier support range.

As an implicit UE category specification method, UE categories can be implicitly identified based on a one-to-one mapping relationship by other parameters such as a reception available band of a UE or peak data rate thereof.

The base station (BS) may specify supportable frequency carrier RFs in cell-specific radio resource control (RRC) information to transmit the specified RFs to any base station (BS) or UEs within a cell. For example, the base station (BS) may transmit supportable frequency carrier RFs to any base station (BS) or UEs within a cell through a primary broadcast channel (P-BCH), cell-specific RRC signaling, a broadcast control channel (BCCH), a dedicated broadcast channel (DBCH), or SU information.

Conversely, a UE may include information as to frequency carrier RFs, which can be received when accessing any base station (BS) or a cell, in a profile or may inform a base station (BS) of the information through additional signaling.

A base station (BS) including a downlink scheduler and/or an uplink scheduler may semi-statically update information as to frequency carrier RFs which can be allocated to individual terminals. Accordingly, the base station (BS) can transmit the information as to frequency carrier RFs to individual terminals through UE-specific RRC signaling (or higher layer signaling).

For example, the base station (BS) may semi-statically transmit information as to candidate bands, which can be used by each terminal, i.e., information as to which carrier can be used by the UE, to UEs through RRC signaling.

In a multi-carrier system supporting transmission and reception of multiple carriers, a central frequency and a carrier bandwidth may be differently set according to each carrier. In addition, the number of frequency carriers, which can be supported by each base station (BS) and each UE to transmit and receive carriers, a detailed central frequency, and a frequency bandwidth may be differently set according to UE categories (e.g., UE levels) or base station (BS) categories (e.g., base station levels, cell levels, cluster levels, or network levels).

In a circumstance in which the base station (BS) applies multiple carriers, content of necessary setup information and various control information according to setup, and a transmitting/receiving method therefor may be differently applied according to setting levels of UE categories or base station (BS) categories.

To set a central frequency of an international mobile telecommunications-advanced (IMT-A) or LTE-A system, the following two methods may be considered.

1. Method for locating a central frequency on multiple carriers while maintaining a frequency raster of an IMT system (or LTE system); and
2. Method for independently locating a central frequency regardless of a frequency raster of an IMT system.

Moreover, to support a wider system bandwidth of the IMT-A system than a system bandwidth of the IMT system, two methods for setting a bandwidth of each carrier included in multiple frequency carriers may be considered. For example, a method of operating multiple carriers depending on a target system bandwidth may be considered. Namely, a method for differently constructing the number of carriers or a bandwidth of each carrier may be considered to support a target system bandwidth.

FIGS. 5 and 6 illustrate methods for setting a bandwidth of a carrier in a multi-carrier system.

A method for allocating a bandwidth of a carrier is as follows.

To support a target system bandwidth, a user symmetrically allocates a basic frequency block in both directions on the basis of a specific central frequency. Thereafter, a frequency carrier (FC) less than the basic frequency block may be allocated to the other bands less than A MHz. At this time, even when allocating the frequency carrier to the bands less than A MHz, a necessary frequency carrier is symmetrically allocated in both directions to allocate the target system bandwidth.

In FIG. 5, a system bandwidth is set to 100 MHz and a central frequency is set to 50 MHz. In FIG. 10, a system bandwidth is set to 70 MHz and a central frequency is set to 35 MHz. Various bandwidths ranging from 20 MHz to 100 MHz may be supported by a terminal (e.g., UE).

FIG. 6 illustrates another method for setting a bandwidth of a carrier in a multi-carrier system.

To support a target system bandwidth, a user allocates a bandwidth in units of a basic frequency block. Thereafter, a frequency carrier less than the basic frequency block may be asymmetrically allocated to the other bands less than A MHz.

Referring to FIG. 7, a basic frequency is first allocated in an overall system bandwidth and then a central frequency is set. In this case, a frequency bandwidth may be asymmetrically allocated based on the central frequency.

In the LTE system, each UE is unable to recognize which one of physical resources is used to transmit a control channel of the UE is transmitted. In addition, each UE is unable to recognize which subframe will receive a control channel of the UE. Therefore, each UE can receive its own control channel using a blind decoding method in which each UE decodes all control channels until receiving the UE control channel.

In a mobile communication system, the user equipment (UE) may receive information from the base station (BS) via downlink, and the UE may transmit information via uplink. A variety of data and control information may be transmitted from and received in the UE, and a variety of physical channels may be used according to categories and usages of transmission- or reception-information of the UE.

FIG. 8 is a conceptual diagram illustrating physical channels for use in a 3GPP system and a general method for transmitting a signal using the physical channels.

Referring to FIG. 8, when powered on or when entering a new cell, a UE performs initial cell search in step S801. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire informat ion broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S802.

On the other hand, if the UE initially accesses the BS or if the UE does not have radio resources for signal transmission, it may perform a random access procedure to the BS in steps S803 to S806. For the random access, the UE may transmit a specific sequence as a preamble to the BS on a Physical Random Access CHannel (PRACH) in step S803 and receive a response message for the random access on a PDCCH and a PDSCH corresponding to the PDCCH in step S804. In the case of contention-based RACH other than the handover case, the UE may perform a content ion resolution procedure by transmitting an additional PRACH in step S805 and receiving a PDCCH and a PDSCH in step S806.

After the foregoing procedure, the UE may receive a PDCCH and a PDSCH in step S807 and transmit a Physical Uplink Shared CHannel (PUSCH) and a Physical Uplink Control CHannel (PUCCH) in step S808, as a general downlink/uplink (DL/UL) signal transmission procedure. Here, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

The initial cell search procedure shown in FIG. 8 needs to be changed in a multi-carrier environment of the present invention. The initial cell search procedure for use in the multi-carrier environment according to the present invention will hereinafter be described in detail.

In the initial cell search procedure, the UE may attempt to detect a synchronous channel (SCH) signal in units of a frequency raster.

If the synchronous channel (SCH) signal has been successfully detected in one of the aggregated downlink carriers, the detected carrier may be set to a downlink (DL) reference carrier or a primary carrier. In this case, the UE may receive a physical cell ID. Even when the corresponding carrier is not set to the reference carrier, the downlink carrier from which the SCH signal has been detected will hereinafter be referred to as a reference carrier for convenience of description and better understanding of the present invention.

The UE may receive a primary broadcast channel (P-BCH) from a reference carrier, such that it can receive a downlink transmission bandwidth, a Physical Hybrid ARQ Indicator Channel (PHICH), a system frame number (SFN), the number of Tx antennas of the BS, etc.

In order to acquire information required for initial access, the UE receives system information (SI-x) transmitted as a reference carrier. The system information (SI-x) includes an uplink (UL) bandwidth, uplink E-UTRA Absolute Radio Frequency Channel Number (UL EARFCN), higher layer signaling related to setting of several UL/DL channels. That is, if the UE recognizes an absolute radio frequency channel number (EARFCN) of a UL carrier and a bandwidth thereof by receiving system information, the UE can acquire information regarding a DL-UL pair band for use in frequency division multiplexing (FDM).

The UE may set the UL carrier, that has acquired information, to a UL reference carrier. As described above, in the case where a reference carrier is not established separately in uplink, a UL carrier linked to a DL carrier in which a synchronous channel (SCH) signal has been detected is referred to as a reference carrier for convenience of description and better understanding of the present invention.

The BS transmits cell-specific multi-carrier setup information through a DL reference carrier, and enables the UE to recognize a carrier setup of the corresponding cell. In this case, the same physical cell ID may be transmitted through synchronous channel signals of multiple DL carriers aggregated in one cell, and different physical cell IDs maybe transmitted according to individual carriers. If the UE has already recognized carrier setup information of the cell, it is able to change a carrier through a simple handover procedure.

The cell-specific multi-carrier setup information may be transmitted through extended system information (extended SI-x) for a UE depending on the LTE-A standard, or maybe transmitted to a UE through a reserved part from among a primary broadcast channel (P-BCH) defined in a general LTE standard (LTE Rel. 8). As another transmission method, cell-specific multi-carrier setup information may be contained in broadcast- or system-information of the corresponding cell, or may also be contained in an EARFCN of the corresponding cell.

The cell-specific multi-carrier setup information may include information indicating a DL carrier from among multiple carriers of the corresponding cell, information of a carrier frequency, DL/UL carrier linkage information of the corresponding cell, and the like.

If multiple DL carriers contained in the same cell have the same physical cell IDs, DL carrier information within the cell, which has been acquired from the cell-specific multi-carrier setup information, can be used, such that the UE may not receive a P-BCH, system information (SI-x), and a synchronous channel.

Conversely, if multiple DL carriers within the cell have different physical cell IDs, a UE detects a synchronous channel in each DL carrier using DL carrier information acquired from the cell-specific multi-carrier setup information, such that it receives a physical cell ID of each carrier. The UE may generate a reference signal sequence for each carrier and perform scrambling and the like using the received physical cell ID. Thereafter, the UE may receive a P-BCH and system information, and recognize information of a UL carrier linked to each DL carrier.

If link information of DL/UL carriers within the cell is transmitted separately, the UE may recognize link information irrespective of the presence or absence of system information.

[The Present Invention—Linkage]

A detailed description of a carrier aggregation method based on a linkage between DL and UL carriers capable of being assigned to an arbitrary UE in a multi-carrier system will be given below.

Carrier aggregation methods may be divided into two methods, i.e., a cell-specific method and a UE-specific method. The term "cell-specific" may indicate a carrier setup from the viewpoint of an arbitrary cell or a BS. If the term "cell" indicates one downward compatible carrier or one downward incompatible carrier, the term "cell-specific" may be used for carriers (managed by an arbitrary BS), each of which is represented by a cell.

1) Cell-Specific Aggregation (Cell-Specific DL/UL Linkage)

Cell-specific carrier aggregation may be established by either an arbitrary BS or cell. Cell-specific carrier aggregation for use in frequency division multiplexing (FDM) may be configured to decide a linkage of DL and UL according to a default Tx-Rx separation defined in the LTE Rel-8 and/or LTE-A standard.

2) UE-Specific Carrier Aggregation (UE-Specific DL/UL Linkage)

The UE-specific carrier aggregation may be configured in the form of a carrier aggregation capable of being used by a specific UE or UE group using a predetermined method (UE capability, negotiation, signaling, broadcasting, etc.) used between a BS and a UE. For example, the UE-specific carrier aggregation defined in the LTE-A is as follows.

UE downlink (DL) component carrier (CC) set: UL DL component carrier set is a set of DL component carriers, that can be established through dedicated signaling and be scheduled in such a manner that the UE can receive a PDSCH via downlink.

UE UL component carrier (CC) set: UE UL component carrier set is a set of UL component carriers, that can be scheduled in such a manner that the UE transmits a PUSCH via uplink.

In addition to the above-mentioned two CC sets, the present invention can further define the following CC sets.

Physical downlink control channel (PDCCH) monitoring set: Differently from a UE DL/UL component carrier set, the PDCCH monitoring set may be contained in a UE DL component carrier set, be configured to include some parts of the UL component carrier set, or be subject to the UE DL component carrier set or other component carriers. The UE monitors a physical downlink control channel (PDCCH) contained in the PDCCH monitoring set. The PDCCH monitoring set may have cell-specific characteristics.

Measurement set: As a carrier aggregation technique is recently introduced, the amount of measurement results to be reported from the UE to the BS is naturally increased. In order to reduce the amount of reporting overhead or in order to effectively measure UE capability, a measurement set may be defined.

The above-mentioned methods for constructing the aforementioned UE-specific carrier aggregation may be classified according to flexibility. For example, a UE-specific carrier aggregation (DL/UL linkage) may be established irrespective of a cell-specific carrier aggregation, and may also be established within the scope in which the UE-specific carrier aggregation does not escape from the cell-specific carrier aggregation structure.

Next, methods for constructing a carrier aggregation according to the present invention can be classified according to a linkage format dependent upon the number of UL component carriers or DL component carriers assigned to one UE (irrespective of UE-specific or cell-specific status).

1) Symmetry

In a symmetrical format, a DL component carrier and a UL component carrier are linked to each other one by one, such that the ratio of the number of DL component carriers to the number of UL component carriers is set to 1:1.

2) Asymmetry

In an asymmetrical format, the number of DL component carriers is different from the number of UL component carriers. In other words, the UL component carrier and the DL component carriers are not linked to each other one by one, and a detailed description thereof will hereinafter be described with reference to FIG. 9.

FIGS. 9(a) and 9(b) show examples of an asymmetric carrier aggregation applicable to embodiments of the present invention.

FIG. 9(a) shows one example in which the number of DL component carriers is higher than the number of UL component carriers. In FIG. 9(a), one UL component carrier is linked to two DL component carriers (DL:UL=2:1). For convenience of description and better understanding of the present invention, the example of FIG. 9(a) is referred to as a 'DL heavy'.

Next, FIG. 9(b) shows one example in which the number of UL component carriers is higher than the number of DL component carriers. In FIG. 9(b), two UL component carriers are linked to one DL component carrier (DL:UL=1:2). For convenience of description and better understanding of the present invention, the example of FIG. 9(b) is referred to as 'UL heavy'

Methods for constructing a carrier aggregation can be classified according to a carrier scheduling format in a carrier aggregation environment.

1) General Scheduling

In a multi-carrier environment according to the present invention, a physical downlink control channel (PDCCH) of an arbitrary DL component carrier may include resource allocation information of a physical downlink shared channel (PDSCH) having the same DL component carrier as in the PDCCH and resource al locat ion information of a physical uplink shared channel (PUSCH) of one UL component carrier linked to the corresponding DL component carrier.

In other words, general scheduling may indicate an exemplary case in which resource allocation information of other DL component carriers and/or UL component carriers is not contained in a downl ink control channel of an arbitrary DL component carrier while the BS performs scheduling. In this case, a downlink control channel information (DCI) format of the general LTE Rel-8 and a physical downlink control channel (PDCCH) transmission structure may be used without change. Therefore, transmission of an associated physical downlink shared channel (PDSCH), transmission of UL control information (e.g., UL HARQACK/NACK), and transmission of an uplink shared channel may satisfy various matters defined in the general LTE standard.

2) Cross Carrier Scheduling

Differently from general scheduling, a physical downlink shared channel (PDSCH) having anther downlink component carrier (DL CC) maybe scheduled through a physical downlink control channel (PDCCH) of an arbitrary DL component carrier. Alternatively, a physical uplink shared channel (PUSCH) that is transmitted according to a UL grant transmitted through an arbitrary DL component carrier, may be transmitted through another UL component carrier different from a UL carrier linked to a DL component carrier having received the UL grant. The above-mentioned case will hereinafter be referred to as 'cross carrier scheduling' in the present invention.

The cross carrier scheduling requires carrier indication information to indicate which UL component carrier and/or which UL component carrier are adapted to transmit a PDSCH and/or PUSCH indicated by a PDCCH. Such carrier indication information is contained in a DL grant or UL grant, and is then transmitted to the UE. In addition, according to the cross carrier scheduling, transmission of a PDSCH, transmission of a UL ACK/BACK, transmission of a PUSCH, and transmission of a PHICH need to be changed.

In addition, information as to whether cross carrier scheduling is allowed may be 'UE-specific', 'UE group-specific', or 'cell-specific'. Carrier indication information (i.e., CI bits field) dependent upon the allowance of cross carrier scheduling may be activated/deactivated by executing semi-static signaling at an arbitrary OSI layer.

The present invention provides a variety of methods for effectively transmitting/receiving physical channels according to the above-mentioned individual carrier aggregation formats (e.g., DL/UL asymmetry, DL/UL symmetry, and/or cross carrier scheduling).

Physical Control Channel Format Indicator Channel (PCFICH)

First, a method for effectively transmitting/receiving a PCFICH in a multi-carrier environment according to one embodiment of the present invention will hereinafter be described in detail.

The embodiment of the present invent ion provides the following three methods to transmit the PCFICH, and a detailed description thereof will be described in detail.

Method 1

PCFICH may be carrier-specifically transmitted through all DL component carriers. The first method (Method 1) may effectively manage and use resources of a control information region of each carrier. For these operations, respective DL carriers may be transmitted with different control channel format indicators (CFIs). If necessary, the PCFICH may not be transmitted according to carrier characteristics, and this means that an LTE-format PDCCH is not contained in a carrier. In this case, if a control channel is contained in a specific carrier, a general LTE terminal (legacy UE) may not access the corresponding carrier, and separate accessible control channel information may be assigned to the LTE-A terminal.

Method 2

PCFICH contains common carrier information such that a control channel format indicator (CFI) may be commonly transmitted. In this case, a common carrier PCFICH may be transmitted through all aggregated DL component carriers, or may also be transmitted through one or more specific carriers only.

Method 3

PCFICH may have common carrier information in units of a group, such that it can be carrier-commonly transmitted in units of a group in which a control channel format indicator (CFI) is decided. In this case, a group-based common carrier PCFICH may be transmitted through all aggregated DL component carriers within the corresponding group, or may also be transmitted through one or more specific carriers only.

The first to third methods (Methods 1 to 3) will hereinafter be described in detail.

If PDCCHs via which respective DL component carriers are transmitted differ in size, especially, if PDCCH need not be transmitted to all aggregated DL component carriers, it is preferable that a control channel format indicator (CFI) value be carrier-specifically transmitted as shown in the first method (Method 1).

In order to prevent a PDCCH from being allocated in a corresponding carrier (i.e., in order to support zero PDCCH allocation), four states (or four indexes) formed by a control channel format indicator (CFI) having the size of 2 bits may be used. That is, the number of OFDM symbols used for transmission of a physical downlink control channel (PDCCH) is sequentially set to 1, 2, 3, and 0, and 0, 1, 2, and 3 (0b00~ob11) are sequentially mapped to 1, 2, 3, and 0 OFDM symbols in such a manner that the size of the PDCCH can be indicated. 2 bits of the control channel format indicator (CFI) according to the general LTE standard are obtained by correcting the result mapped in the order of {1, 2, 3, reserved}, and a general mapping result of 2 bits can be maintained within a narrow system bandwidth (BW). In order to prevent incorrect interpretation of such a control channel format indicator (CFI), CFI correction dependent upon the first method (Method 1) may be excluded in a specific situation (e.g., a DL component carrier and a narrow bandwidth setup are simultaneously implemented while a downlink carrier is established).

In a DL carrier aggregation situation, zero PHICH allocation, in which a Physical Hybrid ARQ Indicator Channel (PHICH) is not allocated to a DL component carrier to which no PHICH is assigned, may be indicated. In this case, a 1 bit field indicating allocation or non-allocation of a PHICH is assigned to a primary BCH (P-BCH), or a specified system information class (SI-x class) of the LTE system is established as cell common system information on a broadcast control channel (BCCH) and thus the SI-x class is transmitted. Although such system information (SI-x class) may be transmitted in the same carrier, it actually affects the standard that enables a PHICH structure to obtain system information (SI-x class), such that information regarding corresponding control channels may be contained in a specific carrier related to a carrier including no PHICH. In association with the above-mentioned description, if no PHICH is assigned, a zero PDCCH status may always be indicated through a control channel format indicator (CFI) of a PCFICH on the assumption that no PDCCH is transmitted in a corresponding DL carrier. However, in the case where some specific and/or UE-specific PDCCHsare transmitted on a DL carrier indicating non-allocation of a PHICH, a control channel format indicator (CFI) indicating the number of OFDM symbols allocated to a PDCCH may be transmitted through a PCFICH. However, the use of a special value may cause ambiguity of a PDCCH structure, such that it is preferable that an operation for accessing a specific carrier be limited for each UE. In this case, a control channel format indicator (CFI) on a DL carrier in which PHICH transmission is conducted is set to a specific value indicating non-allocation of a PDCCH, so that the set value may be transmitted to the UE through a PCFICH.

A method for effectively transmitting a PCFICH when cross carrier scheduling is allowed according to one embodiment of the present invention will hereinafter be described in detail.

A PDCCH and a PDSCH for an arbitrary UEA may be transmitted through different carriers. For example, it is assumed that an arbitrary BS supports three DL component carriers (DL CCs #1, #2, #3) and three UL component carriers (UL CCs #1, #2, #3) for the UE A. In this case, a PDCCH of the UE A may be transmitted to a DL CC #1, and a PDSCH indicated by a corresponding PDCCH may be transmitted to a DL CC #2 or #3.

In more detail, it is assumed that a PDSCH is transmitted through a DL CC #2, and the UE A decodes a control channel format indicator (CFI) (that is transmitted over a PCFICH) of the DL CC #1 without generating any errors, so that no problems occur in a Cyclic Redundancy Check (CRC) check of a PDCCH. In this case, the UE A must also decode a PCFICH of the DL CC #2 without generating any errors so as to decode a PDSCH of the DL CC #2 indicated by a PDCCH of the DL CC #1.

In the case where a PDCCH and a PDSCH are transmitted through the same carrier as in the general LTE Rel-8 system, a PCFICH decoding error of the corresponding carrier inevitably causes a PDCCH decoding error. In addition, if the PDCCH decoding error has occurred, the UE does not decode a PDSCH. In this case, the UE decides that there is no scheduled data in the UE, and does not decode a PDSCH, so that the UE does not perform any operation in a feedback (HARQ) response subframe for the corresponding data. The BS transmits a PDCCH to an arbitrary UE at the n-th subframe, expects to receive a feedback (HARQ) response to a PDSCH indicated by the corresponding PDCCH at the (n+4)-th subframe. However, if the BS does not receive a feedback (HARQ) response, retransmission of the corresponding data is not performed, and new transmission is performed.

However, if cross carrier scheduling is allowed in the same manner as in the LTE-A, unexpected problems may occur. For example, although a PDCCH has been successfully decoded (i.e. PDCCH CRC OK) by correctly decoding a PCFICH of a first DL component carrier to which a PDCCH is transmitted, there may occur a failure in PCFICH decoding of a second DL component carrier to which a PDSCH is transmitted. In this case, the UE inevitably fails to receive a PDSCH of the second DL component carrier such that a NACK response to the corresponding PDSCH is transmitted to the BS. Since the UE transmits a NACK response to the corresponding PDSCH, the BS transmits a retransmission packet to the UE. However, herein, the UE wrongly decodes a PCFICH, and stores incorrect PDSCH data caused by the PCFICH decoding error in a buffer so that unexpected problems are continuously encountered in a PDSCH HARQ process. In more detail, the UE does not store information regarding a packet causing a PDSCH decoding error in the buffer under the condition that a PCFICH is correctly decoded, such that it stores incorrect PDSCH data caused by the PCFICH decoding error in the buffer, resulting in the occurrence of problems in a PDSCH HARQ process.

One embodiment of the present invention provides the following methods so as to minimize not only the number of PCFICH decoding errors encountered in the aforementioned cross carrier scheduling but also the number of HARQ process problems caused by such PCFICH decoding error.

1) Firstly, One embodiment of the present invention provides a method for simultaneously transmitting not only a carrier indicator field serving as carrier indication information indicating which DL component carrier is used to transmit a PDSCH, but also a control channel format indicator value of the corresponding DL component carrier. That is, a PDCCH may include a control channel format indicator value of a DL component carrier at which a PDSCH indicated by the corresponding PDCCH is to be received.

In this case, afield for a control channel format indicator value contained in a PDCCH DCI format may be contained in the PDCCH only when cross carrier scheduling is enabled. If cross carrier scheduling is activated (enabled), the UE can recognize a control channel format indicator value of a DL component carrier at which a PDSCH is to be received, using the control channel format indicator (CFI) value that has been received through a PDCCH. Alternatively, under the conditions described above, the UE may recognize i) a control channel format indicator value of a DL component carrier (at which a PDSCH is to be received) through a control channel format indicator value contained in the PDCCH, or may also recognize ii) the same control channel format indicator value of the DL component carrier by decoding a PCFICH of a DL component carrier at which a PDSCH is to be received. Under the same conditions, according to still another method, the UE may recognize i) a control channel format indicator value of a DL component carrier (at which a PDSCH is to be received) through a control channel format indicator contained in the PDCCH, and may also recognize ii) the same control channel format indicator value of the DL component carrier by decoding a PCFICH of a DL component carrier at which a PDSCH is to be received, in such a manner that information as to whether or not the control channel format indicator value is duplicated can be recognized.

If the UE repeatedly confirms the control channel format indicator as described above, UE operations can be classified according to the following two cases.

First, according to one case of the two cases, a control channel format indicator value of a PDCCH is identical to a control channel format indicator value contained in a PCFICH of a DL component carrier to which a PDSCH is to be transmitted. In this case, the UE decides that a control channel format indicator value of a DL component carrier at which a PDSCH is to be received has been correctly decoded, receives a PDSCH according to scheduling allocation information indicated by the PDCCH, and performs a feedback procedure (i.e., HARQ procedure) according to the PDSCH reception result.

Conversely, a detailed description of the other case in which a control channel format indicator value of aPDCCH is different from a control channel format indicator value of a PCFICH of a DL component carrier at which the PDSCH is to be received will hereinafter be described in detail. In this case, the UE decides that the control channel format indicator value of a DL component carrier at which a PDSCH is to be received has been wrongly decoded. That is, the UE decides that a PDCCH has been correctly decoded by CRC-processing a PDCCH, but decides that a control channel format indicator value of a DL component carrier at which a PDSCH is to be received has been wrongly decoded. In this case, the UE does not decode a PDSCH using the correctly decoded PDCCH information (that is, PDSCH scheduling information received at a PDCCH, a carrier indicator for a DL component carrier to which the corresponding PDSCH is to be transmitted, and information regarding a control channel format indicator). Instead of using the correctly decoded PDCCH information, it is preferable that the UE transmits no HARQ response information to the BS in the same manner as in a UE failing to receive a PDCCH. That is, it is assumed that, although the BS for use in the general LTE Rel-8 transmits a PDCCH to the UE, the UE fails to correctly decode the corresponding PDCCH, so that the UE may perform the procedure specified to solve the above-mentioned problem. In contrast, the UE may decode a PDSCH on the basis of PDCCH information. That is, in order to decode a PDSCH using the scheduled carrier, a PCFICH value needs to be decoded. Herein, if this PCFICH value is different from a value indicated by a PDCCH, the UE may have priority over the PCFICH value at a PDCCH completely verified by a CRC. In this case, in order to decode a PDSCH, the UE may acquire information to be used for selecting a data symbol from PDCCH information for which CRC verification has been completed.

2) Secondly, from the viewpoint of a scheduler, the same control channel format indicator value may be assigned to individual component carriers (CCs) (i.e., component carriers to which a PDCCH and a PDSCH indicated by the corresponding PDCCH are transmitted) serving as a target of the cross carrier scheduling.

3) Thirdly, control channel format indicator values of all DL component carriers serving as a target of cross carrier scheduling managed by an arbitrary BS are established to be identical in terms of time. That is, in the case where one carrier in which cross carrier scheduling is not allowed and the other case in which cross carrier scheduling is allowed are simultaneously present in a plurality of carriers managed by one BS, the same control channel format indicator value is assigned to each carrier for which cross carrier scheduling is allowed. In addition, an independent control channel indicator value may be assigned to other carriers for which cross carrier scheduling is not allowed. In other words, control channel format indicator values of all DL component carriers serving as a target of the cross carrier scheduling are identical to one another, but a control channel format indicator value per subframe may be variably established.

If the UE has successfully decoded a PDCCH of an arbitrary DL component carrier under the cross carrier scheduling situation, this means that a control channel format indicator value of the corresponding DL component carrier has been correctly decoded through a PCFICH. Therefore, the UE can receive a PDSCH of a DL component carrier indicated by a carrier indicator field using the control channel format indicator value of the DL component carrier that has received the PDCCH. In this case, the UE may receive i) a PDSCH without decoding a PCFICH of a different DL component carrier to which a PDSCH is to be transmitted using a PCFICH value of a DL component carrier that has received a PDCCH, and may determine ii) whether a control channel format indicator is duplicated by decoding a PCFICH of a DL component carrier to which a PDSCH is to be transmitted, and then decode the PDSCH.

4) Fourthly, control channel format indicator values of various component carriers (CCs) related to one BC component carrier (i.e., a BC component carrier to which a PDCCH is transmitted, a different BC component carrier to which a PDSCH indicated by the BC component carrier is transmitted, an NBC component carrier, and an extended component carrier) maybe established to be identical to a control channel format indicator value of a component carrier to which a PDCCH is transmitted.

In this case, an NBC component carrier and/or an extended component carrier, each of which transmits a PDSCH, may be limited to component carriers linked to a UL component carrier linked to the BC component carrier to which a PDCCH is transmitted, or may be established irrespective of linkage to the UL component carrier.

5) Fifthly, through a component carrier (UE-specific primary component carrier or a cell-specific primary component carrier) capable of being decoded by each LTE-A UE supporting the cross carrier scheduling or through system information of a component carrier to which a PDCCH is to be transmitted, control channel format indicators of other component carriers may be transmitted to each UE.

6) Sixthly, If one carrier includes an independently operating frequency domain and an extended segment defined as an extended frequency domain of the frequency domain, the PCFICH value may be differently analyzed or interpreted. In other words, a PCFICH value of the independently operating part is applied only to a corresponding frequency domain, the same or different value as the PCFICH value may be selectively applied to the extended region of the frequency domain. That is, if the same value as the PCFICH value is assigned to and used in the frequency domain and the extended frequency domain, a PDSCH part of the extended frequency domain is started in the same manner as in the independent frequency domain. On the other hand, if a control channel as in the LTE system is not established in the extended frequency domain according to the LTE-A system characteristics, the PDSCH may have the same start position as in a subframe or may start from the position of the OFDM symbol having a constant offset. In this case, the offset value may be signaled.

Physical Downlink Control Channel (PDCCH)

A method for effectively transmitting and receiving a PDCCH in a multi-carrier environment according to another embodiment of the present invention will hereinafter be described in detail.

Although the embodiment of the present invention assumes a DL heavy status in which two DL carriers are linked to one UL carrier as shown in FIG. 9(a), it should be noted that the embodiment of the present invention can also be applied to multi-carrier aggregation of the symmetrical- and UL heavy-types without departing from the scope and spirit of the present invention.

The UL grant serving as control information including scheduling information of a physical uplink shared channel (PUSCH) of an arbitrary UL component carrier may be transmitted through two DL component carriers linked to the UL component carrier. In this manner, if the UL grant information is transmitted through all DL carriers linked to one UL component carrier, efficiency of resources used for transmission of a downlink control channel may be deteriorated. In addition, since a UE is unable to recognize which downlink carrier is to be used for transmission of the UL grant, the UE has to perform blind decoding of all DL component carriers linked to the corresponding UL component carrier.

Therefore, this embodiment of the present invention provides a method for transmitting UL grant information through one DL component carrier instead of all DL component carriers linked to one UL component carrier. As a result, resources used for transmission of a DL control channel can be efficiently used, resulting in a reduction in complexity of the blind decoding of the UE.

A variety of methods for selecting a downlink component carrier to which UL grant information is transmitted according to another embodiment of the present invention will hereinafter be described in detail.

1) First Method: If a primary carrier is decided and selected from among a plurality of DL component carriers linked to one UL carrier according to a predetermined method, the UL grant information may be transmitted through the corresponding DL primary carrier. In this case, the primary carrier may be cell-specific, UE-specific, or UE group-specific. In this case, the primary carrier may be established per DL/UL linkage regardless of downlink (DL) and uplink (UL).

2) Second Method: When determining the order of DL component carriers linked to one UL carrier, the UL grant may be transmitted through the first or last carrier on the basis of a DL EARFCN.

3) Third Method: In association with DL component carriers linked to one UL component carrier, a DL component carrier to which one UL grant is to be transmitted may be determined using a predefined rule such as a hashing function known to the BS. In this case, the DL component carrier may be cell-specific, UE-specific, or UE group-specific.

4) Fourth method: If the number of DL carriers capable of being accessed by the LTE-based UE from among a plurality of DL component carriers is limited to a predetermined number (less than the total number of DL component carriers), the UL grant may be any one of DL component carriers capable of being accessed by the LTE-based UE, such that a common design (i.e., downward compatibility) related to the LTE standard can be guaranteed. In contrast, in order to implement load balancing, UL grant information for the LTE-A UE may be transmitted through a DL component carrier that can be accessed by the LTE-A UE only.

5) Fifth Method: Assuming that a specific DL component carrier can be accessed by the LTE-based UE according to the above-mentioned fourth method, this means that the corresponding carrier satisfies a default FDD Tx-Rx separation specified in the LTE Rel-8. Therefore, provided that the ratio of DL carriers to UL carriers is set to 2:1, only one DL/UL pair can satisfy the above-mentioned default FDD Tx-Rx separation. For the above-mentioned reason, only one of two DL component carriers can be accessed by the LTE-based UE, and the UL grant can be transmitted only through such a DL component carrier.

6) Sixth Method: Under the same conditions as in the fifth method, the sixth method may restrict and enable a PDCCH (i.e., UL grant information) supporting cross scheduling to be transmitted at a DL component carrier that satisfies the Rel-8 default Tx-Rx separation condition.

7) Seventh Method: The seventh method can determine a DL component carrier, that can automatically transmit UL grant information by a UE ID assigned to each UE, from among DL carriers linked to one UL carrier. The seventh method has an advantage in that Tx overhead of UL grant information is distributed according to respective DL carriers.

8) Eighth method: According to the eighth method, a DCI format for UL grant information may have the same length as other DCI formats as in the DL scheduling assignment. As a result, although UL grant information is transmitted through several DL component carriers linked to one UL component carrier, UE blind decoding complexity is not increased. That is, assuming that the same information bit size is assigned not only to a bandwidth of a specific DL control information format instead of UL grant information, but also to all bandwidths of a DL control information format of the UL grant information, the UE can perform rate matching and CRC only in a region belonging to the corresponding information bit in association with two formats. That is, except for the blind decoding complexity for a control channel element (CCE) aggregation level, the blind decoding complexity caused by rate matching is not increased. According to the above-mentioned $8^{th}$ method, it is preferable that a specific DL control information format that has the same length as that of a DL control information format of the UL grant information may use a different ID than a UE cell ID (i.e., C-RNTI) used for decoding UL grant information.

9) $9^{th}$ method: Carriers for receiving a PDCCH recognized by the LTE-A UE may be restricted to carriers incapable of being accessed by the LTE UE. As a result, control channel complexity caused by scheduling information transmission at each DL carrier may be distributed according to individual carriers.

Next, a method for effectively transmitting a PDCCH during the cross carrier scheduling according to another embodiment of the present invention will hereinafter be described in detail.

If the cross carrier scheduling is allowed and the UE decodes a PDCCH for all the DL component carriers, the blind decoding overhead is unavoidably increased. Therefore, the DL component carrier transmitting a PDCCH is restricted as in the above-mentioned UL grant transmission method (i.e., $6^{th}$ method), such that blind decoding complexity and efficiency of carrier indicator (CI) information can be guaranteed. There are three methods 1) to 3) for selecting/establishing a DL component carrier to transmit a PDCCH during cross carrier scheduling according to the present invention, and a detailed description thereof is as follows: 1) First Method: An LTE BC component carrier satisfying the default Tx-Rx separation condition may be selected as a DL component carrier for PDCCH transmission. 2) Second Method: Cell-specific, UE-specific, or UE group-specific primary carrier maybe selected as a DL component carrier for PDCCH transmission. 3) Third Method: A DL component carrier corresponding to a PDCCH monitoring set explicitly transmitted through separate signaling may be selected as a DL component carrier for PDCCH transmission.

The above-mentioned three methods 1) to 3) are optional, and each method maybe independently used or two or more methods may be simultaneously associated and used.

Detailed operations of a UE according to the above-mentioned methods 1) to 3) will be given below.

A PDCCH monitoring set may be semi-statically established through a dedicated signaling method such as a UE-specific RRC signaling, and may be transmitted as in UE DL CC set information and UE UL CC set information. In addition, when the BS transmits UE-specific carrier allocation information (e.g., UE DL CC set, UE UL CC set, and PDCCH monitoring set) to the UE through dedicated signaling, the BS may inform the UE whether the cross carrier scheduling is enabled (activated).

If the cross carrier scheduling is enabled (activated) when the UE receives UE-specific carrier setup information, the blind decoding may be performed on a downlink control information format including a carrier indicator (CI) field. In contrast, if the cross carrier scheduling is deactivated, the blind decoding may be performed on a downlink control information format not including the CI field.

Besides the explicit cross carrier scheduling activation/deactivation, as an example of a method for enabling the UE to implicitly decide whether the cross carrier scheduling is performed, the UE according to the present invention can determine whether cross carrier scheduling is performed on the basis of the presence or absence of the PDCCH monitoring set information. That is, if information regarding the PDCCH monitoring set is transmitted simultaneously with the UE-specific carrier assignment information that is transmitted through dedicated signaling, the UE has only to decode a PDCCH within the corresponding set. Therefore, the UE determines that cross carrier scheduling has been activated, such that it may perform the blind decoding of a DL control information format including a carrier indicator (CI) field.

In contrast, when the UE-specific carrier setup information is transmitted through dedicated signaling, if information regarding the PDCCH monitoring set is not contained in the UE-specific carrier setup information, a UE DL CC set may be used as DL CCs, each of which is used as a reception target of PDSCH/PDCCH. Thus, the UE decides that the cross carrier scheduling has been deactivated, such that the UE may perform the blind decoding of a downl ink control information format not including the carrier indicator (CI) field.

In accordance with another exemplary method of the present invention, when the BS transmits information of the PDCCH monitoring set to the LTE-A UEs, information regarding monitoring component carriers for the DL grant and information regarding monitoring component carriers for the UL grant are transmitted in different ways. That is, each component carrier to which the DL grant is transmitted is distinguished from each component carrier to which the UL grant is transmitted, such that the UE may receive only the DL grant at a specific DL component carrier and may also receive only the UL grant at another DL component carrier.

UL Grant

A method for effectively transmitting and receiving a UL grant in a multi-carrier environment according to still another embodiment of the present invention will hereinafter be described in detail.

Under the condition that DCI format 0 specified in the LTE Rel.8 is used as a format of the UL grant, if the number of UL component carriers available to an arbitrary UE is higher than the number of DL component carriers, the corresponding UE is unable to recognize which UL component carrier is used for PUSCH resource assignment information after receiving the UL grant received through the DL component carrier. Therefore, in order to support asymmetric carrier aggregation, there is needed a method for informing the UL grant of information as to which UL component carrier is used for PUSCH resource assignment information upon receiving the corresponding UL grant.

For this purpose, the embodiment of the present invention provides the following methods.

In a first method, the UL grant may explicitly include a carrier index that indicates which UL component carrier resource is indicated by the corresponding UL grant.

In another method, n UL component carriers linked to a DL component carrier having received the UL grant are sequentially arranged according to a predetermined reference, and index information indicating which UL component carrier receives the UL grant may be transmitted to the UE. For example, if 5 UL component carriers are linked to one DL component carrier, index information may have a size of 3 bits.

In still another method, the DCI format of the UL grant may be used as a fixed DCI format according to either the number of available (candidate) UL component carriers of the UE or the number of active UL component carriers of the UE. In this case, the available (candidate) UL component carriers of the UE or the active UL component carriers may be notified to the UE through upper layer signaling, or may be UL component carriers overridden through L1/L2 signaling (overridden UL component carriers are encountered when a carrier setup of the cell is ignored) from among component carriers well known to the UE through upper layer signaling. In this case, the UE may perform blind decoding of a DCI format of the UL grant according to either the number of available (candidate) UL component carriers or the number of active UL component carriers. Thus, although the number of candidate UL component carriers or the number of active UL component carriers is not identical to the number of UL component carriers actually scheduled in the corresponding subframe, the UE can recognize the number of UL component carriers and information regarding the scheduling or non-scheduling of each UL component carrier through information regarding the corresponding DCI format.

In the above-mentioned UL/DL grant information, the number of bits of a carrier indicator (CI) is determined according to the number of available UL/DL carriers assigned from the BS to the UE, and may be irrelevant to the number of actually used carriers as necessary. In other words, although the BS may be operated using a smaller number of carriers from among a predetermined number of carriers assigned to the BS at a specific time, it is undesirable that the number of bits of the carrier indicator (CI) contained in the grant information is changed in so far as the BS does not change the number of available carriers.

Physical Hybrid ARQ Indicator Channel (PHICH)

A method for effectively transmitting and receiving a PDCCH in a multi-carrier environment according to still another embodiment of the present invention will hereinafter be described in detail.

Although this embodiment assumes a DL heavy status in which two DL carriers are linked to one UL carrier as shown in FIG. 9(a) for convenience of description and better understanding of the present invention, it should be noted that this embodiment of the present invention can also be applied to multi-carrier aggregation of the symmetrical- and UL heavy-types without departing from the scope and spirit of the present invention.

In accordance with this embodiment, the following two methods may be used to transmit a PHICH acting as feedback information (HARQ ACK/NACK) that indicates whether a reception error of a PUSCH transmitted through one UL component carrier occurs.

In accordance with the first method, a PHICH is transmitted through all DL component carriers linked to one UL component carrier. In accordance with the second method, a PHICH is transmitted through only one of several DL component carriers linked to one UL component carrier.

The first method is based on the aspect that resources for a PHICH are pre-reserved at a DL carrier for use in the LTE Rel.8system. If PHICH resources are assigned at each layer, it is not necessary to assign a PHICH through only one carrier without using the pre-assigned resources.

If the first method is applied, the same PHICH for one PUSCH is transmitted to a plurality of DL component carriers, so that the UE can receive the PHICH through several carriers, resulting in increased reception reliability.

For PHICH assignment, an uplink lowest resource block index (UL lowest RB index) used for the corresponding PUSCH resource assignment and a demodulation reference signal cyclic shift (DM RS CS) on the UL grant are used. In this case, if several PHICHs are transmitted through multiple carriers, a number of the used PHICH group and a PHICH orthogonal sequence index (OS index) may be identical to each other, or may be differently assigned using a different parameter such as a carrier index.

Alternatively, in order to differently assign the PHICH group number and the PHICH orthogonal sequence index during the assignment of several PHICHs, the BS may transmit the UL grant for one PUSCH through several carriers. However, under the condition that the same resource assignment information is assigned to several UL grant messages for one PUSCH, the BS may assign different DM RS CS values to respective UL grant messages, or may also use such several UL grant information to assign a PHICH.

The second method can be more effectively used when the BS supports a carrier to which a PDCCH or PHICH is not transmitted. For this purpose, the present invention provides a variety of methods 1) to 10) for selecting any one DL component carrier to be used for PHICH transmission from among several DL component carriers linked to one UL component carrier, and a detailed description thereof will be given below. A carrier to which a PHICH is to be transmitted through the following methods may be selected as a UE-specific carrier or a cell-specific carrier.

1) First Method: If a primary carrier from among DL component carriers linked to one UL component carrier is established according to a predetermined reference, a PHICH may be transmitted through a corresponding DL primary carrier. In this case, the primary carrier may be cell-specific or UE-specific. In this case, the primary carrier may be established per DL/UL linkage irrespective of DL/UL.

2) Second method: When deciding the order of DL component carriers linked to one UL carrier, a PHICH may be transmitted through the first or last carrier on the basis of a DL EARFCN.

3) Third Method: In association with DL component carriers linked to one UL component carrier, a DL component carrier to which one PHICH is to be transmitted may be determined using the pre-defined rule such as a hashing function known to both the BS and the UE. In this case, the DL component carrier may have cell-specific, UE-specific, or UE group-specific characteristics.

4) Fourth Method: In accordance with the fourth method, a PHICH may be transmitted through a DL component carrier to which a UL grant for the corresponding PUSCH expecting to receive the PHICH is transmitted. The fourth method may correspond to a case in which the above-mentioned methods proposed by the present invention are used. Even when the BS transmits the UL grant through downlink carriers linked to one UL component carrier in the same manner as in the above-mentioned method, the fourth method may also be used. A detailed description of the fourth method will be described later.

5) Fifth Method: The fifth method can determine a DL component carrier that can be used to automatically transmit a PHICH by a UE ID assigned to each UE, from among DL carriers linked to one UL carrier. For example, provided that the number of DL component carriers linked to one UL component carrier is denoted by 'n', a DL component carrier to which a PHICH is to be transmitted may be determined by applying a modulo operation based on the 'n' value to the UE ID value, such that a DL component carrier to which a PHICH is to be transmitted can be determined.

The above-mentioned method has an advantage in that Tx overhead of a PHICH is distributed to respective DL carriers.

6) Sixth Method: In accordance with the sixth method, the BS selects a DL component carrier to which the UL grant is to be transmitted using the above-mentioned fifth method, so that the UL grant is transmitted to the UE. Thereafter, a PHICH associated with a PUSCH that has been transmitted using the corresponding UL grant may be transmitted through a DL component carrier to which the corresponding UL grant has been transmitted as in the above-mentioned fourth method.

7) Seventh Method: If the number of DL carriers capable of being accessed by the LTE-based UE from among several DL component carriers linked to one UL carrier is limited to a predetermined number (<the total number of DL component carriers), a PHICH may be set to any DL component carrier that can be accessed by the LTE-based UE, such that a common design (i.e. downward compatibility) for the LTE standard can be guaranteed. In contrast, in order to achieve PDCCH load balancing, a PHICH for the LTE-A UE may be transmitted through a DL component carrier that can be accessed only by the LTE-A UE.

8) Eighth Method: Assuming that a specific DL component carrier can access the LTE-based UE using the above-mentioned seventh method, this means that the corresponding carrier satisfies the FDD default Tx-Rx separation condition defined in the LTE Rel-8. Therefore, assuming that the ratio of DL to UL carriers is set to 2:1, only one DL/UL pair can satisfy the above-mentioned default Tx-Rx separation condition.

For the above-mentioned reason, according to the $8^{th}$ method, only one of two DL component carriers can be accessed by the LTE-based UE, such that a PHICH can be transmitted through the accessed DL component carrier only.

9) Ninth Method: If the BS supports a carrier to which a PDCCH or PHICH is not transmitted from among multiple carriers, a PHICH may be transmitted only through a DL component carrier in which PDCCH or PHICH transmission is not limited.

In accordance with the ninth method, physical resource mapping of a PHICH may be affected by a PHICH duration transmitted over a PBCH. In addition, a PHICH duration and a PCFICH are correlated with each other to occupy a control channel region, and are configured to greatly affect PHICH resource region assignment. The PHICH duration transmitted through a PBCH is indicated by one bit, and each of a normal duration and an extended duration of the PHICH duration is indicated by one bit. If the PHICH duration is a normal duration, the number of OFDM symbols used for PHICH assignment is always set to 1, and the number of OFDM symbols, each of which receives a PDCCH, may be determined according to a control channel format indicator (CFI) value of a PCFICH at a DL component carrier independently from one OFDM symbol used for PHICH assignment. If the PHICH duration is an extended duration, the number of OFDM symbols used for PHICH assignment is always set to 3. In this case (i.e., in the case where FDD is performed and an MBSFN subframe is not present), the control channel format indicator (CFI) value of a PCFICH should always be set to 3.

Therefore, in order to support a carrier to which a PDCCH or PHICH is not transmitted, the UE may ignore a PHICH duration transmitted over a primary broadcast channel (PBCH) on the basis of correlation between a PBCH and a PCFICH, and may not expect to receive a PHICH at a specific carrier. In accordance with a method for transmitting a PCFICH proposed in one embodiment of the present invention, in order to indicate non-assignment of a PDCCH, a reserved bit value (0b11) of the control channel format indicator (CFI) maybe used, or a conventional 2-bit control channel format indicator (CFI) may be differently interpreted as {0, 1, 2, 3}.

That is, the BS includes PHICH duration information in a PBCH transmitted through multiple aggregated DL component carriers. In addition, the BS carrier-specifically transmits a PCFICH and the control channel format indicator (CFI) indicates the number {0, 1, 2, or 3} of OFDM symbols used for PDCCH transmission. In the case where the control channel format indicator (CFI) value contained in the PCFICH at an arbitrary DL component carrier is set to zero OFDM symbol, the UE may override information of the PHICH duration transmitted to the PBCH and may not expect to receive a PDCCH and a PHICH at the corresponding carrier.

Namely, from the viewpoint of UE operations, if a control channel format indicator (CFI) value of a PCFICH transmitted through a DL component carrier denotes '0' so that a control channel region is not allocated to the corresponding carrier, the UE may override information of the PHICH duration received over a PBCH and PHICH resource assignment information, may perform blind decoding of a control channel at the corresponding carrier or may not receive a PHICH at the corresponding carrier, such that downlink resources can be effectively utilized using the above-mentioned method.

10) Tenth Method: The tenth method includes an index of a DL carrier to be used for PHICH reception in PDCCH. While the above-mentioned methods select a DL carrier to be used for PHICH reception according to the regular rules, if a DL carrier indicator for a PHICH is contained in the PDCCH, the BS can freely select a DL carrier and transmit the UL grant information. In this case, PHICH collision or PHICH distribution for a Multi-User MIMO (MU-MIMO) can be freely performed.

A method for effectively transmitting and receiving a PHICH in a cross carrier scheduling situation according to another aspect of the present invention will hereinafter be described in detail.

FIG. 10 shows a PHICH transmission format in a cross-carrier scheduling situation according to another embodiment of the present invention.

In FIG. 10, it is assumed that the BS allows the cross carrier scheduling and two DL component carriers are linked to two UL component carriers one by one (1:1).

In this case, the cross carrier scheduling for UL grant information is applied, so that UL grant information for a PUSCH to be transmitted to a UL component carrier #2 may be transmitted to a DL component carrier #1. In this case, this embodiment of the present invention provides the following two methods to determine a DL component carrier at which a PHICH carrying feedback information (ACK/NACK) for a PUSCH transmitted through a UL component carrier #2 is received.

1) First Method: In accordance with the first method, a DL component carrier to which UL grant information indicating the corresponding PUSCH is transmitted is determined to be a DL component carrier at which a PHICH for the corresponding UL grant is to be received.

2) Second Method: In accordance with the second method, a DL component carrier linked to a UL component carrier of a PUSCH indicated by UL grant information is determined to be a DL component carrier at which a PHICH for the corresponding UL grant information is to be received.

The first and second methods are classified according to three cases by referring to FIG. 10, and a detailed description thereof will be given below.

First, in a first case (a) shown in FIG. 10, the UL grant #1 for a PUSCH #1 is transmitted from a control region of the DL component carrier #1 (1001), and a PUSCH #1 indicated by the UL grant #1 is transmitted through a UL component carrier #1 (1002). In the first case (a), the cross carrier scheduling is not performed, so that the carrier indicator (CI) field may not be contained in the corresponding PDCCH.

PHICH #1 indicating feedback information (ACK/NACK) for the PUSCH #1 may be transmitted through a DL component carrier #1 (1003). In this case, the above-mentioned two methods may provide the same results. That is, the DL component carrier #1 is always used for PHICH transmission.

Next, in a second case (b) shown in FIG. 10, the UL grant #2 for a PUSCH #2 is transmitted from a control region of the DL component carrier #1 (1001), and a PUSCH #2 indicated by the UL grant #2 is transmitted through a UL component carrier #2 (1012). In the second case (a), the cross carrier scheduling is performed, so that the carrier indicator (CI) field indicating the UL component carrier #2 may be contained in the corresponding PDCCH.

PHICH #2 indicating feedback information (ACK/NACK) for the PUSCH #2 may be transmitted through a DL component carrier #1 (1003). This means that a PHICH is operated according to the above-mentioned first method (a). As a result, in the cross carrier scheduling situation, the UE need not monitor a control region of all DL component carriers, resulting in a reduction in the UE blind decoding overhead.

Next, in a third case (c) shown in FIG. 10, a UL grant #2 for a PUSCH #2 is transmitted from a control region of a DL component carrier #1 (1001), and a PUSCH #2 indicated by the UL grant #2 is transmitted through a UL component carrier #2 (1012). In the third case (c), the cross carrier scheduling is performed, so that the carrier indicator (CI) field indicating the UL component carrier #2 may be contained in a PDCCH.

PHICH #2 indicating feedback information (ACK/NACK) for a PUSCH #2 may be transmitted through a DL component carrier #2 (1013). This case means that a PHICH is operated according to the above-mentioned second method (b).

UL ACK/NACK

A method for effectively transmitting and receiving a UL ACK/NACK in a multi-carrier environment according to another embodiment of the present invention will hereinafter be described in detail.

In a carrier aggregation situation, according to a linkage format between DL and UL component carriers established in an upper layer, n DL component carriers may be linked to an arbitrary UL component carrier. In this case, after a Cyclic Redundancy Check (CRC) is attached to PDSCHs through respective DL component carriers, additional channel coding is performed on the PDSCHs, so that the resultant PDSCHs can be simultaneously transmitted. In this case, there are a variety of methods to transmit a UL feedback (UL ACK/NACK) according to another embodiment of the present invention, and a detailed description thereof will be given below.

1) First method: In a first method, as to N feedback information (NACK/NACK information) for N PDSCH transmission times through respective DL component carriers, the UE performs ACK/NACK bundling through only one value and transmits information of the bundling result to the BS. In this case, PUCCH resource assignment for the bundled ACK/NACK information may be achieved based on a PDCCH lowest control channel element (CCE) index of a PDSCH transmitted via a primary carrier. Alternatively, PUCCH resource assignment may be achieved based on a modulo operation related to the number of DL component carriers, each of which receives a PDSCH for a UE ID, or may be achieved based on a PDCCH lowest CCE index for a PDSCH of DL component carriers to which the corresponding PDSCH is transmitted (i.e., a DL component carrier with the lowest index, a DL component carrier with the highest index, and a DL component carrier with an arbitrary fixed index).

2) Second Method: In accordance with a second method to transmit UL ACK/NACK information, PUCCH resources {2D sequence combination index of ZC sequence cyclic shifting (CS) Walsh cover, and a slot-directional pair index (herein, setting of mix resource block is possible) of a frequency domain physical resource block (PRB)} are identified and differently assigned on a UL component carrier linked to respective DL component carriers to which PDSCHs are simultaneously transmitted. As a result, UL ACK/NACK PUCCH resources may be assigned on the basis of a PDCCH lowest CCE index for the corresponding PDSCH of each DL component carrier in the corresponding PUCCH resource region.

3) Third Method: Each PDCCH lowest CCE index of respective DL component carriers to which PDSCHs are simultaneously transmitted is replaced with a virtual CCE index, and UL ACK/NACK information corresponding to the replaced index is assigned to a PUCCH. In more detail, CCE index sequences of individual DL component carriers linked to an arbitrary UL component carrier are arranged in the order of carrier indexes of the corresponding DL component carriers to which a PDSCh is transmitted, such that a logical virtual CCE index sequence may be constructed. Based on the aforementioned index sequence, if a PDSCH is transmitted according to individual DL component carriers, a lowest CCE index of a PDCCH correspondent to the PDSCH is replaced with a virtual CCE index value in such a manner that the PDCCH lowest CCE index may be mapped to the logical virtual CCE index sequence. Thus, the mapped virtual CCE index sequence may be applied to PUCCH allocation of the correspondent UL ACK/NACK information.

A method for effectively transmitting and receiving UL ACK/NACK information serving as UL feedback in a cross carrier scheduling situation according to another embodiment of the present invention.

In a UL heavy status in which the number of UL component carriers is higher than the number of DL component carriers as shown in FIG. 9(b), during transmission of UL ACK/NACK in response to DL data transmission, the problems encountered in UL grant transmission and PHICH transmission may occur as in the above-mentioned embodiments. That is, UL ACK/NACK for one DL data transmission may be transmitted via all of the plurality of UL component carriers 1 inked to one DL component carrier, or may also be transmitted via only some of the plurality of UL component carriers.

If the UL ACK/NACK information for one DL data transmission is transmitted through several UL component carriers, this means that resources of several UL component carriers are used to transmit the same information, resulting in ineffective utilization of UL resources.

In addition, when considering UE multiplexing in which the number of allocated DL component carriers is higher than the number of UL component carriers, namely, if UL ACK/NACK for several PDSCHs needs to be transmitted through one UL carrier, it is preferable that UL ACK/NACK be transmitted only through one or more UL component carriers.

Considering the above-mentioned reason, a variety of methods for selecting a UL component carrier to which UL ACK/NACK is to be transmitted from among UL component carriers linked to one DL component carrier according to still another embodiment of the present invention will hereinafter be described in detail. By the above-mentioned methods 1) to 6), a UL component carrier to which UE-specific, UE group-specific, or cell-specific UL ACK/NACK is to be transmitted, may be selected.

1) First Method: In a first method, if a primary carrier is selected from among UL component carriers linked to one DL component carrier according to a predetermined reference, UL ACK/NACk information may be transmitted through the corresponding UL primary carrier. In this case, the primary carrier may be cell-specific or UE-specific as necessary. The primary carrier maybe established per DL/UL linkage, -irrespective of DL/UL.

2) Second Method: When deciding the order of UL component carriers linked to one DL component carrier, UL ACK/NACK may be transmitted only through the first or last carrier as necessary.

3) Third Method: In association with UL component carriers linked to one DL component carrier, a UL component carrier to which one or more UL ACK/NACK information for each linkage is to be transmitted may be determined using a predefined rule such as a hashing function known to the UE and the BS. In this case, the UL component carrier may be cell-specific, UE-specific, or UE group-specific.

4) Fourth Method: The fourth method can determine a UL component carrier, that can automatically transmit UL grant information by a UE ID assigned to each UE, from among UL carriers linked to one DL carrier. The fourth method has an advantage in that Tx overhead of UL ACK/NACK information is distributed according to respective UL carriers.

5) Fifth Method: Feedback information (ACK/NACK) of the corresponding DL data is contained in a control channel (i.e., PDCCH) of DL data in such a manner that a UL component carrier to be transmitted from the UE to the BS can be explicitly indicated.

6) Sixth Method: Through a predetermined field from among a DCI format of DL data transmitted via a PDCCH, a UL component carrier that is going to implicitly transmit UL feedback information may be notified of the UE.

Apparatus-UE and BS

Now a description will be given of a UE and a BS for implementing the above-described exemplary embodiments of the present invention, according to another exemplary embodiment of the present invention.

The UE may operate as a transmitter on an uplink and as a receiver on a downlink, while the BS may operate as a receiver on the uplink and as a transmitter on the downlink. That is, each of the UE and the BS may include a transmitter and a receiver for transmission and reception of information or data.

The transmitter and the receiver may include processors, modules, parts, and/or means for implementing the exemplary embodiments of the present invention. Especially, the transmitter and the receiver may include a module (means) for encrypting messages, a module for interpreting encrypted messages, an antenna for transmitting and receiving messages, etc. An example of the transmitter and the receiver will be described below with reference to FIG. 11.

FIG. 11 is a block diagram of a transmitter and a receiver according to another exemplary embodiment of the present invention.

Referring to FIG. 11, the left part corresponds to the transmitter and the right part corresponds to the receiver. Each of the transmitter and the receiver may include an antenna 11055 or 1110, a processor 1120 or 1130, a Transmission (Tx) module 1140 or 1150, a Reception (Rx) module 1160 or 1170, and a memory 1180 or 1190. The components of the transmitter are complementary to those of the receiver. The components of the transmitter and the receiver will be described below in more detail.

The antennas 1105 and 1110 include Tx antennas for transmitting signals generated from Tx modules 1140 and 1150 and Rx antennas for receiving radio frequency (RF) signals and providing the received RF signals to the Rx modules 1160 and 1170. If Multiple Input Multiple Output (MIMO) is supported, two or more antennas may be provided.

The processors 1120 and 1130 generally provide overall control to the UE. Especially, the processors 1120 and 1130 may perform a controller function for implementing the above-described exemplary embodiments of the present invention, a variable Medium Access Control (MAC) frame control function based on service characteristics and a propagation environment, a handover (HO) function, an authentication and encryption function, etc.

Especially, the processor of the UE controls overall UE operations required for transmitting/receiving physical channels in a multi-carrier environment, such that the UE can transmit and receive data to and from a base station (BS) or a relay station.

For example, the processor may determine the number of UL component carriers, the number of DL component carriers, and a linkage between UL and DL component carriers, according to carrier setup information allocated from the BS or the relay station.

Thereafter, the processor can receive the UL grant information from the BS through any DL component carrier from among several DL component carriers available to the processor, and can transmit a PUSCH to the BS through UL resources indicated by the UL grant. In this case, UL resources indicated by the UL grant may be a carrier linked to a DL component carrier where the UL grant has been received, or may be a different UL component carrier not linked to the DL component carrier. In the latter case, cross carrier scheduling is achieved. The processor controls the Rx module, such that it can receive feedback information (ACK/NACK) indicating whether there arises a reception error of a PUSCH that has been transmitted through a PHICH belonging to the same DL component carrier as a DL component carrier that has received the UL grant from the BS after the lapse of a predetermined number of frames.

The above-mentioned processor operation can be applied to both a DL heavy status and a UL heavy status depending on numbers of DL and UL component carriers available to the UE.

Besides, detailed functions for transmitting/receiving various physical channels on other data transmission process are identical to those of the above-mentioned embodiments of the present invention, and as such a detailed description thereof will herein be omitted for convenience of description.

The Tx modules 1140 and 1150 may encode and modulate transmission data scheduled by the processors 1120 and 1130 according to a predetermined coding and modulation scheme and provide the modulated data to the antenna 1110.

The Rx modules 1160 and 1170 may recover original data by demodulating and decoding data received through the antennas 1105 and 1110 and provide the recovered data to the processors 1120 and 1130.

The memories 1180 and 1190 may store programs for processing and control of the processors 1120 and 1130 and temporarily store input/output (I/O) data. Each of the memories 1180 and 1190 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory, a magnetic memory, a magnetic disc, an optical disc, etc.

In the meantime, the BS may perform a control function for implementing the above-described exemplary embodiments of the present invention, Orthogonal Frequency Division Multiple Access (OFDMA) packet scheduling, Time Division Duplex (TDD) packet scheduling and channelization, a variable MAC frame control function based on service characteristics and a propagation environment, a real-time high-speed traffic control function, a handover function, an authentication and encryption function, a packet modulation/demodulation function for data transmission and reception, a high-speed packet channel coding function, a real-time MODEM control function, etc., by at least one of the above-described modules, or the BS may further include an additional module, part or means for performing these functions.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invent ion have exemplarily disclosed not only a method for effectively transmitting/receiving a physical channel in a multi-band environment, but also a UE structure therefor, and the method and UE structure thereof have been exemplarily applied to the 3GPP LTE system for convenience of description. Of course, the embodiments of the present invention may also be applied not only to the 3GPP LTE system but also to other mobile communication systems each of which has a multi-band environment without departing from the scope or spirit of the present invention.

The invention claimed is:

1. A method for transmitting data by a user equipment (UE) in a wireless access system supporting multi-carriers, the method comprising:
   receiving an uplink (UL) grant information for a first UL component carrier (CC) from a base station (BS) through a first downlink (DL) CC among a plurality of DL CCs, wherein the first UL CC is linked with a second DL CC other than the first DL CC;
   transmitting UL data to the BS through UL resources of the first UL CC indicated by the UL grant information; and
   receiving, from the base station and through the first DL CC through which the UL grant information was received, feedback information indicating a reception status of the transmitted UL data,
   wherein the first DL CC among the plurality of DL CCs is specified as a DL CC for receiving the feedback information.

2. The method according to claim 1, wherein the reception of the feedback information is performed at a subframe which comes after a predetermined number of subframes from a subframe indicated by the UL grant information.

3. The method according to claim 1, wherein the UL grant information is received through a Physical Downlink Control Channel (PDCCH) of the first DL CC, and
wherein the feedback information is received through a Physical Hybrid Automatic Repeat Request Indicator Channel (PHICH) of the first DL CC.

4. A method for receiving data by a base station (BS) in a wireless access system supporting multi-carriers, the method comprising:
transmitting an uplink (UL) grant information for a first UL component carrier (CC) to a user equipment (UE) through a first downlink (DL) CC among a plurality of DL CCs, wherein the first UL CC is linked with a second DL CC other than the first DL CC;
receiving UL data from the UE through UL resources of the first UL CC indicated by the UL grant information;
determining a reception status of the received UL data; and
transmitting, to the UE and through the first DL CC through which the UL grant information was transmitted, feedback information indicating the determined reception status of the received UL data,
wherein the first DL CC among the plurality of DL CCs is specified as a DL CC for receiving the feedback information.

5. The method according to claim 4, wherein the feedback information is transmitted through the first DL CC only.

6. The method according to claim 4, wherein the transmission of the feedback information is performed irrespective of a ratio between the number of DL CCs available in the user equipment (UE) and the number of UL CCs available in the user equipment (UE).

7. The method according to claim 4, wherein the UL grant information is transmitted through a Physical Downlink Control Channel (PDCCH) of the first DL CC, and
wherein the feedback information is transmitted through a Physical Hybrid Automatic Repeat Request Indicator Channel (PHICH) of the first DL CC.

8. The method according to claim 4, wherein the reception of the feedback information is performed at a subframe which comes after a predetermined number of subframes from a subframe indicated by the UL grant information.

9. A user equipment (UE) operated in a wireless access system supporting multi-carriers, the UE comprising:
a processor; and
a radio frequency (RF) module for transceiving a radio frequency (RF) signal externally under a control of the processor,
wherein the processor, upon receiving an uplink (UL) grant information for a first UL component carrier (CC) from a base station (BS) through a first downlink (DL) CC among a plurality of DL CCs, transmits UL data to the BS through UL resources of the first UL CC indicated by the UL grant information, and receives, from the base station and through the first DL CC through which the UL grant information was received, feedback information indicating a reception status of the transmitted UL data,
wherein the first UL CC is linked with a second DL CC other than the first DL CC, and
wherein the first DL CC among the plurality of DL CCs is specified as a DL CC for receiving the feedback information.

10. The user equipment (UE) according to claim 9, wherein the processor is configured to receive the feedback information through the first DL CC, irrespective of a ratio between the number of DL CCs available in the user equipment (UE) and the number of UL CCs available in the user equipment (UE).

11. The user equipment (UE) according to claim 9, wherein the processor is configured to receive the feedback information at a subframe which comes after a predetermined number of subframes from a subframe indicated by the UL grant information.

12. The user equipment (UE) according to claim 9, wherein the UL grant information is received through a Physical Downlink Control Channel (PDCCH) of the first DL CC, and
wherein the feedback information is received through a Physical Hybrid ARQ Indicator Channel (PHICH) of the first DL CC.

* * * * *